US012130586B2

(12) United States Patent
Tomita et al.

(10) Patent No.: US 12,130,586 B2
(45) Date of Patent: Oct. 29, 2024

(54) RESIN FINE PARTICLE, THERMOPLASTIC RESIN PARTICLE, AND METHOD FOR PRODUCING RESIN FINE PARTICLE

(71) Applicant: FUJIFILM Business Innovation Corp., Tokyo (JP)

(72) Inventors: Daisuke Tomita, Minamiashigara (JP); Takahiro Yamashita, Minamiashigara (JP); Yukiaki Nakamura, Minamiashigara (JP); Takahisa Tatekawa, Minamiashigara (JP); Masaru Takahashi, Minamiashigara (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 17/874,745

(22) Filed: Jul. 27, 2022

(65) Prior Publication Data

US 2022/0373912 A1 Nov. 24, 2022

Related U.S. Application Data

(62) Division of application No. 16/985,688, filed on Aug. 5, 2020.

(30) Foreign Application Priority Data

Feb. 17, 2020 (JP) ................................. 2020-024709

(51) Int. Cl.
*G03G 9/087* (2006.01)
*G03G 9/08* (2006.01)
*G03G 9/09* (2006.01)

(52) U.S. Cl.
CPC ....... *G03G 9/08755* (2013.01); *G03G 9/0804* (2013.01); *G03G 9/0819* (2013.01); *G03G 9/0904* (2013.01)

(58) Field of Classification Search
CPC ............. G03G 9/08755; G03G 9/0804; G03G 9/0819; G03G 9/0904
See application file for complete search history.

(56) References Cited

U.S. PATENT DOCUMENTS 4,540,595 A 9/1985 Acitelli et al.
4,975,220 A 12/1990 Streitel et al.
(Continued)

FOREIGN PATENT DOCUMENTS

CN 101126911 A 2/2008
CN 107015448 A 8/2017
(Continued)

OTHER PUBLICATIONS

English machine translation of the description of JP-6277810-B2 (Year: 2018).*
(Continued)

*Primary Examiner* — Peter L Vajda
*Assistant Examiner* — Boone Alexander Evans
(74) *Attorney, Agent, or Firm* — Oliff PLC

(57) ABSTRACT

A method for producing a resin fine particle includes dissolving or melting an oily mixture containing at least a polyester resin, a base, and a basic dye while applying a shearing force to the oily mixture, and emulsifying the dissolved or molten oily mixture by adding a surfactant and an aqueous medium while applying a shearing force to the dissolved or molten oily mixture to prepare a dispersion liquid of the resin fine particle. The resin fine particle includes the polyester resin and the basic dye, has a volume average particle diameter of 0.05 μm or more and 1 μm or less, and has a ratio of a concentration of the basic dye in a center of gravity portion of the resin fine particle to a
(Continued)

concentration of the basic dye in a surface layer portion having a depth of 10 nm or less from a surface of the resin fine particle of 0.8 or more.

9 Claims, 2 Drawing Sheets

(56) References Cited

U.S. PATENT DOCUMENTS

| | | | | |
|---|---|---|---|---|
| 5,093,147 | A | 3/1992 | Andrus et al. | |
| 6,387,583 | B1 * | 5/2002 | Yoon | G03G 9/0804 430/137.16 |
| 8,916,317 | B2 * | 12/2014 | Iftime | G03G 9/092 430/45.51 |
| 2008/0026332 | A1 | 1/2008 | Urabe et al. | |
| 2008/0038646 | A1 | 2/2008 | Mera et al. | |
| 2009/0011358 | A1 | 1/2009 | Kikawa et al. | |
| 2010/0075241 | A1 | 3/2010 | Kazmaier et al. | |
| 2010/0084610 | A1 | 4/2010 | Iftime et al. | |
| 2010/0086867 | A1 | 4/2010 | Iftime et al. | |
| 2010/0173239 | A1 * | 7/2010 | Iftime | G03G 9/0821 430/107.1 |
| 2010/0233605 | A1 | 9/2010 | Iida et al. | |
| 2011/0151372 | A1 * | 6/2011 | Watanabe | G03G 9/0825 430/119.86 |
| 2011/0281209 | A1 | 11/2011 | Sugiura et al. | |
| 2012/0237865 | A1 | 9/2012 | Kazmaier et al. | |
| 2014/0001377 | A1 | 1/2014 | Iftime et al. | |
| 2017/0219947 | A1 | 8/2017 | Omori et al. | |

FOREIGN PATENT DOCUMENTS

| | | | | |
|---|---|---|---|---|
| JP | H03-177461 | A | | 8/1991 |
| JP | 2664535 | B2 | | 10/1997 |
| JP | 2004-010846 | A | | 1/2004 |
| JP | 2007-127684 | A | | 5/2007 |
| JP | 4000561 | B2 | | 10/2007 |
| JP | 2009-014872 | A | | 1/2009 |
| JP | 2010-072643 | A | | 4/2010 |
| JP | 2010-090379 | A | | 4/2010 |
| JP | 2010-090739 | A | | 4/2010 |
| JP | 2010-092051 | A | | 4/2010 |
| JP | 2012-128025 | A | | 7/2012 |
| JP | 2017-003818 | A | | 1/2017 |
| JP | 6277810 | B2 | * | 2/2018 |
| JP | 2019-045757 | A | | 3/2019 |

OTHER PUBLICATIONS

PubChem Compound Summary of Rose Bengal G (Year: 2023).*
4-methyl-7-aminocoumarin PubChem Compound Summary (Year: 2023).*
Basic Yellow 40 PubChem Compound Summary (Year: 2023).*
Feb. 11, 2021 Search Report issued in European Patent Application No. 20191490.0.
Oct. 7, 2022 Office Action issued in U.S. Appl. No. 16/985,688.
May 12, 2023 Office Action issued in U.S. Appl. No. 16/985,688.
Oct. 31, 2023 Office Action issued in Japanese Patent Application No. 2020-024709.
Mar. 19, 2024 Office Action issued in Japanese Patent Application No. 2020-024709.
May 2, 2024 Office Action issued in European Patent Application No. 20191490.0.
Aug. 28, 2024 Office Action issued in Chinese Patent Application No. 202010938874.7.

* cited by examiner

RESIN FINE PARTICLE, THERMOPLASTIC RESIN PARTICLE, AND METHOD FOR PRODUCING RESIN FINE PARTICLE

CROSS-REFERENCE TO RELATED APPLICATIONS

This application is a divisional application of U.S. patent application Ser. No. 16/985,688 filed Aug. 5, 2020, which is based on and claims priority under 35 USC 119 from Japanese Patent Application No. 2020-024709 filed on Feb. 17, 2020.

BACKGROUND

Technical Field

The present invention relates to a resin fine particle, a thermoplastic resin particle, and a method for producing the resin fine particle.

Related Art

As resin fine particles in the related art, those described in Patent Literatures 1 to 4 are known.

Patent Literature 1 discloses a dyed emulsion composition containing: an emulsion polymer obtained by emulsion-polymerizing a monomer mixture containing a vinyl monomer (A) having a cyano group, a vinyl monomer (B) having an acidic functional group, and another vinyl monomer (C) in the presence of an anionic surfactant (D) having a structure represented by the following formula (1); and a dye.

(1)

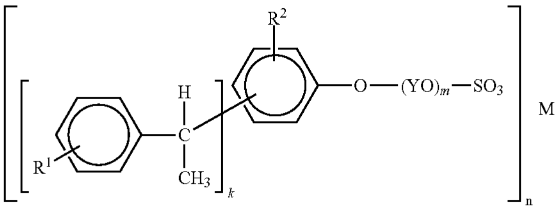

In the above formula (1), $R^1$ is a hydrogen atom or a methyl group, $R^2$ is an alkyl group having 1 to 4 carbon atoms, Y is an alkylene group having 2 to 4 carbon atoms, M is a monovalent or divalent cation, k is an integer of 1 to 3, m is an integer of 1 to 100, and n is 1 or 2.

Patent Literature 2 discloses fluorescent organic nanoparticles containing: a polymer matrix containing one or more types of cross-linked polymer resins; and one or more types of fluorescent dyes incorporated into the polymer matrix, in which the fluorescent organic nanoparticles have a particle diameter of less than 500 nm.

Patent Literature 3 discloses a fluorescent pigment composition containing: a fluorescent dye; and a polyamide-polyester thermoplastic resin generated by a condensation reaction between a polycarboxylic acid selected from the group consisting of isophthalic acid, terephthalic acid, 2,6-naphthalenedicarboxylic acid, trimesic acid, and mixtures thereof and at least one aliphatic primary amino alcohol having 2 to 4 carbon atoms.

In addition, as an example of thermoplastic resin particles, Patent Literature 4 discloses a toner containing a binder resin and a colorant, in which the colorant contains a color pigment and a fluorescent dye, and when contents in a mass basis of the color pigment and the fluorescent dye in the toner are $W_G$ and $W_F$, respectively, the $W_G$ and $W_F$ satisfy the following expression (1):

$$W_G \times 0.5 > W_F > W_G \times 0.025 \quad (1)$$

and, when an absorption peak wavelength of the color pigment is $P_G$ and an emission peak wavelength of the fluorescent dye is $P_F$, the $P_G$ and $P_F$ satisfy the following expression (2):

$$P_G < P_F \quad (2).$$

Patent Literature 1: JP-A-2004-10846
Patent Literature 2: JP-A-2010-90739
Patent Literature 3: JP-A-H03-177461
Patent Literature 4: JP-A-2017-3818

SUMMARY

Aspects of non-limiting embodiments of the present disclosure related to a resin fine particle containing a polyester resin and a basic dye and having a higher color developing density as compared with a case where a volume average particle diameter of the resin fine particle is less than 0.05 μm or more than 1 μm, or a ratio of a concentration of the basic dye in a center of gravity portion of the resin fine particle to a concentration of the basic dye in a surface layer portion having a depth of 10 nm or less from a surface of the resin fine particle is less than 0.8.

Additional aspects of non-limiting embodiments of the present disclosure related to a thermoplastic resin particle having a higher color developing density as compared with a case where an average distance $X^D$ between adjacent basic dye-containing domains in a cross section of the thermoplastic resin particle is out of a range of an expression L to be described later.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin fine particle, containing: a polyester resin; and a basic dye, in which a volume average particle diameter of the resin fine particle is 0.05 μm or more and 1 μm or less, and a ratio of a concentration of the basic dye in a center of gravity portion of the resin fine particles to a concentration of the basic dye in a surface layer portion having a depth of 10 nm or less from a surface of the resin fine particles is 0.8 or more.

BRIEF DESCRIPTION OF THE DRAWINGS

Exemplary embodiment(s) of the present invention will be described in detail based on the following figures, wherein.

Figure 1:
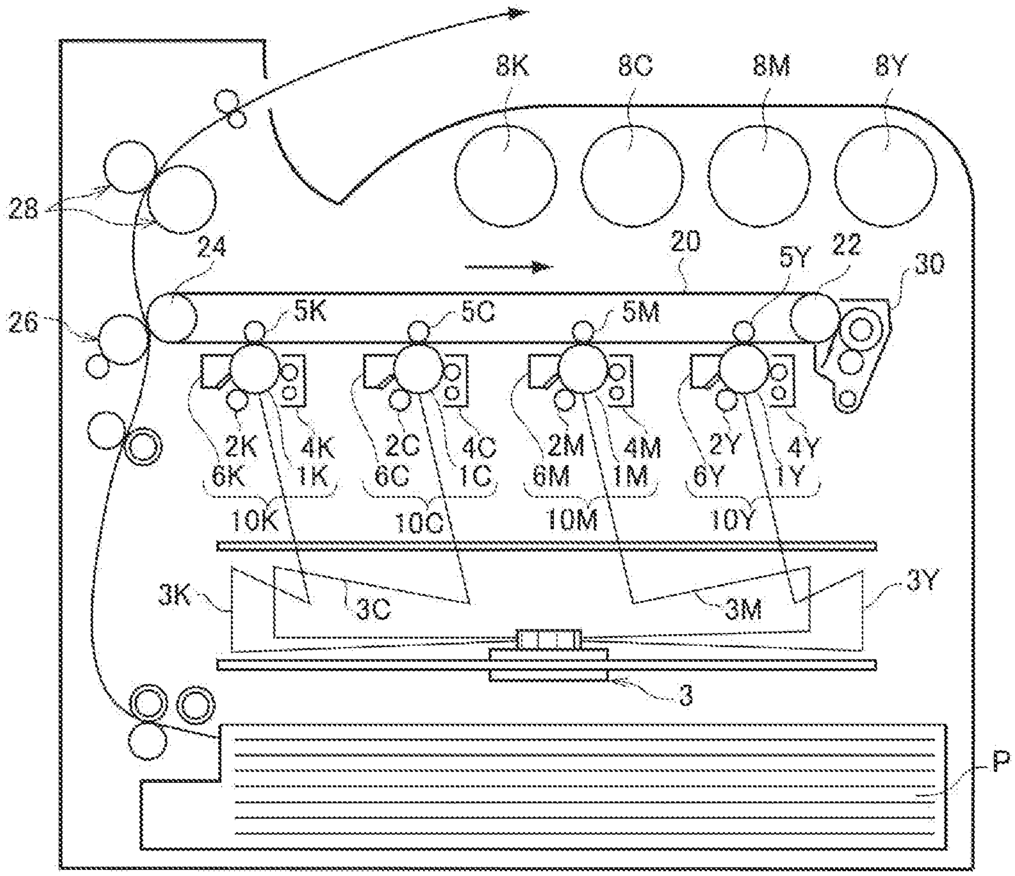
FIG. 1 is a schematic configuration diagram showing an image forming apparatus when the thermoplastic resin particle according to the exemplary embodiment is used as an electrostatic charge image developing toner.
Figure 2:
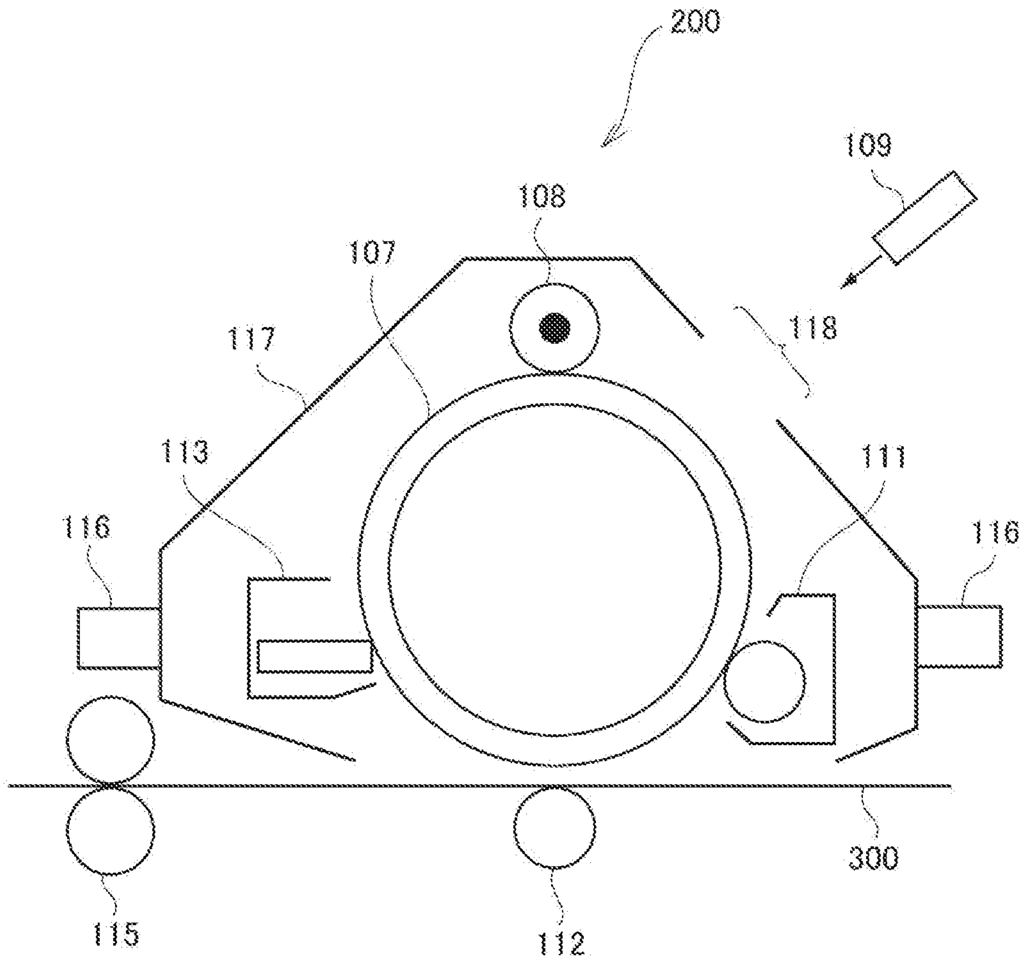
FIG. 2 is a schematic configuration diagram showing a process cartridge when the thermoplastic resin particle according to the exemplary embodiment is used as an electrostatic charge image developer.

Reference numbers and signs in FIG. 1 and FIG. 2 are described below.

1Y, 1M, 1C, 1K: photoconductor (an example of image carrier)
2Y, 2M, 2C, 2K: charging roller (an example of charging unit)
3: exposure device (an example of electrostatic charge image forming unit)
3Y, 3M, 3C, 3K: laser beam
4Y, 4M, 4C, 4K: developing device (an example of developing unit)
5Y, 5M, 5C, 5K: primary transfer roller (an example of primary transfer unit)
6Y, 6M, 6C, 6K: photoconductor cleaning device (an example of image carrier cleaning unit)
8Y, 8M, 8C, 8K: toner cartridge
10Y, 10M, 10C, 10K: image forming unit
20: intermediate transfer belt (an example of intermediate transfer body)
22: drive roller
24: support roller
26: secondary transfer roller (an example of secondary transfer unit)
28: fixing device (an example of fixing unit)
30: intermediate transfer belt cleaning device (an example of intermediate transfer body cleaning unit)
P: recording paper (an example of recording medium)
107: photoconductor (an example of image carrier)
108: charging roller (an example of charging unit)
109: exposure device (an example of electrostatic charge image forming unit)
111: developing device (an example of developing unit)
112: transfer device (an example of transfer unit)
113: photoconductor cleaning device (an example of image carrier cleaning unit)
115: fixing device (an example of fixing unit)
116: mounting rail
117: housing
118: opening for exposure
200: process cartridge
300: recording paper (an example of recording medium)

DETAILED DESCRIPTION

In the present description, in a case of referring to the amount of each component in the composition, when there are a plurality of substances corresponding to each component in the composition, unless otherwise specified, it refers to the total amount of the plurality of substances present in the composition.

Hereinafter, an exemplary embodiment as an example of the present invention will be described.

<Resin Fine Particle>

The resin fine particle according to the exemplary embodiment is a resin fine particle containing a polyester resin and a basic dye, in which the volume average particle diameter of the resin fine particle is 0.05 μm or more and 1 μm or less, and the ratio of the concentration of the basic dye in the center of gravity portion of the resin fine particle to the concentration of the basic dye in the surface layer portion having a depth of 10 nm or less from the surface of the resin fine particle is 0.8 or more.

As a result of the intensive study of the present inventors, it is found that, in the resin fine particle containing a polyester resin and a basic dye in the related art, the dispersibility of the basic dye in the resin fine particle and the dispersibility of the resin fine particle when used in a toner or the like may be not sufficient, resulting in a low color developing density.

With the above configuration, an image having a high color developing density may be obtained from the resin fine particle according to the exemplary embodiment. The reason for the above effect is not clear, but it is presumed that the reason is as follows.

The resin fine particle according to the exemplary embodiment contains a polyester resin and a basic dye, and has a volume average particle diameter of 0.05 μm or more and 1 μm or less and a ratio of the concentration of the basic dye in the center of gravity portion of the resin fine particle to the concentration of the basic dye in the surface layer portion having a depth of 10 nm or less from the surface of the resin fine particle of 0.8 or more, and thereby the inside of the particle is dyed with the basic dye. In addition, the particle diameter of the particle is small. Therefore, a thermoplastic resin particle having excellent dispersibility and less uneven distribution of dye may be obtained, and an image having a high color developing density may be obtained.

The resin fine particle according to the exemplary embodiment is preferably used as an image forming resin fine particle, is preferably used as a colorant resin fine particle for a thermoplastic resin particle, and more preferably used as a fluorescent colorant resin fine particle for a thermoplastic resin particle.

Hereinafter, the resin fine particle according to the exemplary embodiment will be described in detail.

In the resin fine particle according to the exemplary embodiment, the ratio of the concentration of the basic dye in the center of gravity portion of the resin fine particle to the concentration of the basic dye in the surface layer portion having a depth of 10 nm or less from the surface of the resin fine particle is 0.8 or more, and is, from the viewpoints of the dispersibility of the basic dye in the resin fine particle, the dispersibility of the resin fine particle, and the color developing density, preferably 0.85 or more, more preferably 0.9 or more, and particularly preferably 0.92 or more and 1.0 or less.

In the exemplary embodiment, in the resin fine particle, the ratio of the concentration of the basic dye in the center of gravity portion of the resin fine particle to the concentration of the basic dye in the surface layer portion having a depth of 10 nm or less from the surface of the resin fine particle is measured according to the following method.

The resin fine particle is embedded in a resin and cut with a microtome to obtain a cross section.

For the cross section, scanning electron microscope-energy dispersive X-ray spectroscopy (SEM-EDX) analysis is performed to analyze, specifically map, the presence or absence of an element (for example, Zn in the case of Basic violet 11:1) derived from a dye.

The concentration of the element derived from the dye is determined for both the surface layer (in the cross-sectional view of the resin fine particle, 10 nm and less from the contour) and the center of gravity in the cross section of the resin fine particle. Specifically, the average concentration of the element derived from the dye (or the total amount of the element) is calculated in 5 nm square at 5 positions in the surface layer and at the center of gravity for one particle, and this is performed for 50 particles. In the case of using the average value, for each particle, the concentration ratio of the average concentration at the 5 positions in the surface layer to the concentration at the center of gravity is determined, and the average of the concentration ratios of 50 resin fine particles is calculated as the concentration ratio value of the basic dye. In the case of using the total amount of elements, for each particle, the ratio of the average total amount of the element at the 5 positions in the surface layer to the total amount of the element at the center of gravity is determined, and the average of the ratios of 50 resin fine particles is calculated as the concentration ratio value of the basic dye. When determining the concentration (either the average concentration or the total amount) of the element derived from the dye, the presence or absence of the element derived from the dye is binarized to make a contrast by SEM-EDX analysis.

The volume average particle diameter of the resin fine particle according to the exemplary embodiment is 0.05 μm or more and 1 μm or less, and is, from the viewpoints of the dispersibility of the basic dye in the resin fine particle, the dispersibility of the resin fine particle, and the color developing density, preferably 0.08 μm or more and 0.8 μm or less, more preferably 0.1 μm or more and 0.5 μm or less, and particularly preferably 0.1 μm or more and 0.3 μm or less.

The volume average particle diameter of the resin fine particle according to the exemplary embodiment is measured according to the following method.

A cumulative distribution by volume is drawn from the side of the smallest diameter with respect to particle diameter ranges (so-called channels) separated using the particle diameter distribution obtained by the measurement of a laser diffraction-type particle diameter distribution measurement device (e.g., LA-700 manufactured by Horiba, Ltd.), and a particle diameter corresponding to the cumulative percentage of 50% with respect to the entire particles is set as a volume average particle diameter $D_{50v}$.

(Polyester Resin)

The resin fine particle according to the exemplary embodiment contains a polyester resin.

Examples of the polyester resin include known polyester resins.

Amorphous Polyester Resin

Examples of the amorphous polyester resin include a polycondensate of a polycarboxylic acid and a polyhydric alcohol. As the amorphous polyester resin, a commercially available product or a synthesized product may be used.

The "crystalline" of a resin refers to having a clear endothermic peak in differential scanning calorimetry (DSC), not a stepwise change in endothermic amount, and specifically refers to that the half-value width of the endothermic peak when measured at a temperature rising rate of 10 (° C./min) is within 10° C.

On the other hand, the "amorphous" of the resin refers to that the half-value width is larger than 10° C., that the endothermic amount changes stepwise, or that no clear endothermic peak is observed.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenylsuccinic acid, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), and an anhydride or a lower alkyl ester (for example, having 1 or more and 5 or less carbon atoms) thereof. Among these, the polycarboxylic acid is preferably, for example, an aromatic dicarboxylic acid.

As the polycarboxylic acid, a tricarboxylic acid or higher carboxylic acid having a cross-linked structure or a branched structure may be used in combination with a dicarboxylic acid. Examples of the tricarboxylic acid or higher carboxylic acid include trimellitic acid, pyromellitic acid, and an anhydride or a lower alkyl ester (for example, having 1 or more and 5 or less carbon atoms) thereof.

The polycarboxylic acid may be used alone or in combination of two or more thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as a bisphenol A ethylene oxide adduct and a bisphenol A propylene oxide adduct). Among these, the polyhydric alcohol is preferably, for example, an aromatic diol and an alicyclic diol, and more preferably an aromatic diol.

As the polyhydric alcohol, a trihydric alcohol or higher polyhydric alcohol having a cross-linked structure or a branched structure may be used in combination with a diol. Examples of the trihydric alcohol or higher polyhydric alcohol include glycerin, trimethylolpropane, and pentaerythritol.

The polyhydric alcohol may be used alone or in combination of two or more thereof.

The glass transition temperature Tg of the amorphous polyester resin is preferably 50° C. or higher and 80° C. or lower, and more preferably 50° C. or higher and 65° C. or lower.

The glass transition temperature is obtained from a DSC curve obtained by differential scanning calorimetry (DSC), and is more specifically obtained by the "extrapolated glass transition onset temperature" described in JIS K 7121-1987 "Method for measuring glass transition temperature of plastics", which is a method for obtaining the glass transition temperature.

The weight average molecular weight Mw of the amorphous polyester resin is preferably 5,000 or more and 1,000,000 or less, and more preferably 7,000 or more and 500,000 or less.

The number average molecular weight Mn of the amorphous polyester resin is preferably 2,000 or more and 100,000 or less.

The molecular weight distribution Mw/Mn of the amorphous polyester resin is preferably 1.5 or more and 100 or less, and more preferably 2 or more and 60 or less.

The weight average molecular weight and the number average molecular weight are measured by gel permeation chromatography (GPC). The molecular weight is measured by GPC by using a GPC HLC-8120GPC manufactured by Tosoh Corporation as a measurement device, a column TSKgel Super HM-M (15 cm) manufactured by Tosoh Corporation, and a THF solvent. The weight average molecular weight and the number average molecular weight are calculated from the measurement result using a molecular weight calibration curve prepared using a monodispersed polystyrene standard sample.

The amorphous polyester resin is obtained by a well-known production method. Specifically, for example, the amorphous polyester resin may be obtained by a method in which the polymerization temperature is set to 180° C. or higher and 230° C. or lower, the pressure in the reaction system is reduced as necessary, and the reaction is performed while removing water and alcohol generated during the condensation.

When raw material monomers are insoluble or incompatible at the reaction temperature, a high boiling point solvent may be added as a dissolution assisting agent for dissolution.

In this case, the polycondensation reaction is carried out while distilling off the dissolution assisting agent. When there is a poorly compatible monomer, it is preferable that the poorly compatible monomer is firstly condensed with an acid or alcohol to be polycondensed with the poorly compatible monomer and then the obtained product is polycondensed with the main component.

Crystalline Polyester Resin

Examples of the crystalline polyester resin include a polycondensate of a polycarboxylic acid and a polyhydric alcohol. As the crystalline polyester resin, a commercially available product or a synthesized product may be used.

Here, in order to easily form a crystalline structure, the crystalline polyester resin is preferably a polycondensate obtained by using a polymerizable monomer having a linear aliphatic group rather than a polymerizable monomer having an aromatic group.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (for example, dibasic acids such as phthalic acid, isophthalic acid, terephthalic acid, and naphthalene-2,6-dicarboxylic acid), and an anhydride or a lower alkyl ester (for example, having 1 or more and 5 or less carbon atoms) thereof.

As the polycarboxylic acid, a tricarboxylic acid or higher carboxylic acid having a cross-linked structure or a branched structure may be used in combination with a dicarboxylic acid. Examples of the tricarboxylic acid include aromatic carboxylic acids (such as 1,2,3-benzenetricarboxylic acid, 1,2,4-benzenetricarboxylic acid, and 1,2,4-naphthalenetricarboxylic acid), and an anhydride or a lower alkyl ester (for example, having 1 or more and 5 or less carbon atoms) thereof.

As the polycarboxylic acid, a dicarboxylic acid having a sulfonic acid group or a dicarboxylic acid having an ethylenic double bond may be used in combination with these dicarboxylic acids.

The polycarboxylic acid may be used alone or in combination of two or more thereof.

Examples of the polyhydric alcohol include aliphatic diols (such as a linear aliphatic diol having 7 or more and 20 or less carbon atoms in the main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among these, the aliphatic diol is preferably 1,8-octanediol, 1,9-nonanediol, and 1,10-decanediol.

As the polyhydric alcohol, a trihydric alcohol or higher alcohol having a cross-linked structure or a branched structure may be used in combination with a diol. Examples of the trihydric alcohol or higher polyhydric alcohol include glycerin, trimethylolethane, trimethylolpropane, and pentaerythritol.

The polyhydric alcohol may be used alone or in combination of two or more thereof.

Here, the polyhydric alcohol preferably has an aliphatic diol content of 80 mol % or more, and preferably 90 mol % or more.

The melting temperature of the crystalline polyester resin is preferably 50° C. or higher and 100° C. or lower, more preferably 55° C. or higher and 90° C. or lower, and still more preferably 60° C. or higher and 85° C. or lower.

The melting temperature is obtained from the DSC curve obtained by differential scanning calorimetry (DSC) according to the "melting peak temperature" described in JIS K 7121-1987 "Method for measuring transition temperature of plastics", which is a method for obtaining the melting temperature.

The weight average molecular weight Mw of the crystalline polyester resin is preferably 6,000 or more and 35,000 or less.

The crystalline polyester resin may be obtained by a well-known production method, similar to the amorphous polyester resin.

The weight average molecular weight Mw of the polyester resin is preferably 5,000 or more and 1,000,000 or less, more preferably 7,000 or more and 500,000 or less, and particularly preferably 25,000 or more and 60,000 or less, from the viewpoint of scratch resistance of the image. The number average molecular weight Mn of the polyester resin is preferably 2,000 or more and 100,000 or less. The molecular weight distribution Mw/Mn of the polyester resin is preferably 1.5 or more and 100 or less, and more preferably 2 or more and 60 or less.

The weight average molecular weight and the number average molecular weight of the polyester resin are measured by gel permeation chromatography (GPC). The molecular weight is measured by GPC by using a GPC HLC-8120GPC manufactured by Tosoh Corporation as a measurement device, a column TSKgel Super HM-M (15 cm) manufactured by Tosoh Corporation, and a tetrahydrofuran (THF) solvent. The weight average molecular weight and the number average molecular weight are calculated from the measurement result using a molecular weight calibration curve prepared using a monodispersed polystyrene standard sample.

From the viewpoints of the dispersibility of the basic dye in the particle, the dispersibility of the resin fine particle, and the color developing density, the polyester resin preferably has an acid group, and more preferably has a carboxy group.

From the viewpoints of the dispersibility of the basic dye in the particle, the dispersibility of the resin fine particle, and the color developing density, the acid value of the polyester resin is preferably 1 mgKOH/g or more and 50 mgKOH/g or less, more preferably 2 mgKOH/g or more and 30 mgKOH/g or less, and particularly preferably 5 mgKOH/g or more and 18 mgKOH/g or less.

The acid value may be measured according to JIS K0070 (1992).

The resin fine particle may contain the polyester resin alone or in combination of two or more types thereof.

From the viewpoints of the dispersibility of the basic dye in the resin fine particle, the dispersibility of the resin fine particle, and the color developing density, the content of the polyester resin is preferably 50 mass % or more and 99 mass % or less, more preferably 60 mass % or more and 98 mass % or less, and still more preferably 70 mass % or more and 95 mass % or less based on the whole resin fine particle.

(Basic Dye)

The resin fine particle according to the exemplary embodiment contains a basic dye.

The basic dye is a dye having a basic group and is preferably an ionic dye having a cation moiety as a chromophore.

In the exemplary embodiment, the "pigment" is a colorant having a solubility of less than 0.1 g in 100 g of water at 23° C. and a solubility of less than 0.1 g in 100 g of cyclohexanone at 23° C., and the "dye" is a colorant having a solubility of 0.1 g or more in 100 g of water at 23° C. or in 100 g of cyclohexanone at 23° C.

Examples of the basic dye include a diazine dye, an oxazine dye, a thiazine dye, an azo dye, an anthraquinone dye, a xanthene dye, a triarylmethane dye, a phthalocyanine dye, an auramine dye, an acridine dye, and a methine dye. Specific examples thereof include the following dyes. For example, "Basic Red 2" is also referred to as "C. I. Basic Red 2".

Diazine dyes such as Basic Red 2, 5, 6, 10, Basic Blue 13, 14, 16, Basic Violet 5, 6, 8, 12, and Basic Yellow 14;
- oxazine dyes such as Basic Blue 3, 6, 10, 12, 74;
- thiazine dyes such as Basic Blue 9, 17, 24, 25, and Basic Green 5;
- azo dyes such as Basic Red 18, 22, 23, 24, 29, 30, 31, 32, 34, 38, 39, 46, 51, 53, 54, 55, 62, 64, 76, 94, 111, 118, Basic Blue 41, 53, 54, 55, 64, 65, 66, 67, 162, Basic Violet 18, 36, Basic Yellow 15, 19, 24, 25, 28, 29, 38, 39, 49, 51, 57, 62, 73, and Basic Orange 1, 2, 24, 25, 29, 30, 33, 54, 69;
- anthraquinone dyes such as Basic Blue 22, 44, 47, 72;
- xanthene dyes such as Basic Red 1, 1:1, 3, 4, 8, 11, and Basic Violet 10, 11, 11:1;
- triarylmethane dyes such as Basic Red 9, Basic Blue 1, 2, 5, 7, 8, 11, 15, 18, 20, 23, 26, 35, 81, Basic Violet 1, 2, 3, 4, 14, 23, and Basic Green 1, 4;
- phthalocyanine dyes such as Basic Blue 140;
- auramine dyes such as Basic Yellow 2, 3, 37;
- acridine dyes such as Basic Yellow 5, 6, 7, 9, and Basic Orange 4, 5, 14, 15, 16, 17, 18, 19, 23; and
- methine dyes such as Basic Red 12, 13, 14, 15, 27, 28, 37, 52, 90, Basic Yellow 11, 13, 20, 21, 52, 53, Basic Orange 21, 22, and Basic Violet 7, 15, 16, 20, 21, 22.

As the basic dye, a basic fluorescent dye may be used. Since an image having a high color developing density may be obtained from the resin fine particle according to the exemplary embodiment, an image having a high fluorescence density may be obtained by using the basic fluorescent dye.

From the viewpoints of the color developing density and the fluorescence density, the basic fluorescent dye particularly preferably has a cationic group.

From the viewpoint of fluorescence intensity, the cationic group is preferably an onium group, more preferably an ammonium group, an iminium group, or a pyridinium group, still more preferably an ammonium group, and particularly preferably a quaternary ammonium group.

The basic fluorescent dye may have only one cationic group or may have two or more cationic groups, and preferably has 1 or more and 4 or less cationic groups, more preferably 1 or 2 cationic groups, and particularly preferably only one cationic group, from the viewpoint of the fluorescence intensity.

From the viewpoint of the fluorescence intensity, preferred examples of the basic fluorescent dye include Basic Red 1 (Rhodamine 6G), Basic Red 1:1, Basic Red 2, Basic Red 12, Basic Red 13, Basic Red 14, Basic Red 15, Basic Red 36, Basic Violet 7, Basic Violet 10 (Rhodamine B), Basic Violet 11 (Rhodamine 3B), Basic Violet 11:1 (Rhodamine A), Basic Violet 15, Basic Violet 16, Basic Violet 27, Basic Yellow 1, Basic Yellow 2, Basic Yellow 9, Basic Yellow 24, Basic Yellow 40, Basic Orange 15, Basic Orange 22, Basic Blue 1, Basic Blue 3, Basic Blue 7, Basic Blue 9, Basic Blue 45, and Basic Green 1; and preferred examples thereof include Basic Red 1 (Rhodamine 6G), Basic Red 1:1, Basic Red 2, Basic Red 12, Basic Red 13, Basic Red 14, Basic Red 15, Basic Red 36, Basic Violet 7, Basic Violet 10 (Rhodamine B), Basic Violet 11 (Rhodamine 3B), Basic Violet 11:1 (Rhodamine A), Basic Violet 15, Basic Violet 16, and Basic Violet 27.

The basic fluorescent dye preferably has a fluorescence peak wavelength in spectral reflectance of 380 nm or more and 760 nm or less. Among these, the fluorescence peak wavelength may be appropriately selected according to the color to be expressed. For example, when it is desired to express fluorescence pink, the fluorescence peak wavelength is preferably 560 nm or more and 670 nm or less, and particularly preferably 580 nm or more and 650 nm or less.

The value of the spectral reflectance at the fluorescence peak wavelength of the basic fluorescent dye is preferably 100% or more, more preferably 105% or more, and particularly preferably 110% or more, from the viewpoint of image graininess.

The resin fine particle may contain the basic dye alone or in combination of two or more types thereof.

From the viewpoints of the dispersibility of the basic dye in the resin fine particle, the dispersibility of the resin fine particle, and the color developing density, the content of the basic dye is preferably 0.1 mass % or more and 20 mass % or less, more preferably 0.3 mass % or more and 15 mass % or less, and particularly preferably 0.5 mass % or more and 10 mass % or less based on the whole resin fine particles.

From the viewpoints of the dispersibility of the basic dye in the resin fine particle, the dispersibility of the resin fine particle, and the color developing density, the content of the basic dye in the resin fine particle is preferably 0.1 part by mass or more and 20 parts by mass or less, more preferably 0.3 part by mass or more and 15 parts by mass or less, and particularly preferably 0.5 part by mass or more and 10 parts by mass or less with respect to 100 parts by mass of the polyester resin in the resin fine particle.

The resin fine particle may contain components other than the polyester resin and the basic dye.

Examples of other components include a base and a surfactant at the time of production, and a colorant other than the basic dye, which will be described later.

From the viewpoints of the dispersibility of the basic dye in the resin fine particle, the dispersibility of the resin fine particle, and the color developing density, the total content of the polyester resin and the basic dye in the resin fine particle is preferably 70 mass % or more, more preferably 80 mass % or more, and particularly preferably 90 mass % or more and 100 mass % or less, based on the whole resin fine particle.

(Method for Producing Resin Fine Particle)

The method for producing the resin fine particle according to the exemplary embodiment is not particularly limited, and a known method is used. Among these, the method for producing the resin fine particle according to the exemplary embodiment is preferably a method including: a dissolving or melting step of making an oily mixture containing at least a polyester resin, a base, and a basic dye into a dissolved state or a molten state while applying a shearing force thereto; and an emulsification step of emulsifying the dissolved or molten oily mixture by adding a surfactant and an aqueous medium while applying a shearing force thereto.

—Dissolving or Melting Step—

The method for producing the resin fine particle according to the exemplary embodiment preferably includes a dissolving or melting step of making an oily mixture containing at least a polyester resin, a base, and a basic dye into a dissolved state or a molten state while applying a shearing force thereto.

In the dissolving or melting step, the base may be used alone or in combination of two or more thereof.

In the dissolving or melting step, a surfactant may be used. The surfactant may be used alone or in combination of two or more thereof.

In the dissolving or melting step, a polyester resin (amorphous resin and crystalline resin), a base, and a basic dye are dissolved and mixed using an organic solvent, or melt-mixed by heat without using an organic solvent. The "organic solvent" in the exemplary embodiment is an organic solvent that dissolves a resin. It is also possible to use an organic solvent other than an aqueous medium such as alcohol in combination.

The mixing temperature in the melting step is not particularly limited, and is preferably 20° C. to 150° C., and more preferably 35° C. to 100° C. from the viewpoints of mixing uniformity and emulsification dispersibility in the emulsification step.

The melting temperature in the dissolving or melting step is preferably a temperature higher than or equal to the glass transition temperature Tg of an amorphous resin, and more preferably a temperature higher than or equal to "Tg of the amorphous resin+5° C." in order to facilitate mixing.

There is no particular limitation on the method for making the material into the dissolved state or the molten state while applying the shearing force for use in the dissolving or melting step, and a known mixing device or the like is used. Examples of the mixing device include a mixing tank equipped with a stirrer, a roll mill, a kneader, a pressure kneader, a Banbury mixer, a Labo Plasto mill, and a single-screw or twin-screw extruder.

Among these, a mixing tank equipped with a stirrer, an extruder and a kneader are preferred.

Specific examples of the base for use in the dissolving or melting step include: hydroxides of alkali metals such as lithium, sodium and potassium; or oxides or hydroxides of alkaline earth metals such as magnesium and calcium. Among these, from the viewpoints of fixability and transferability of the thermoplastic resin particle, alkali metal or alkaline earth metal hydroxides are preferred, alkali metal hydroxides are more preferred, potassium hydroxide or sodium hydroxide is even more preferred, and sodium hydroxide is particularly preferred.

Examples of the surfactant for use in the dissolving or melting step include various surfactants such as an anionic surfactant, an amphoteric surfactant, a cationic surfactant, and a nonionic surfactant. Among these, from the viewpoints of fixability and transferability of the thermoplastic resin particle, an anionic surfactant is preferred, a sulfate-based or sulfonic acid-based anionic surfactant is more preferred, and a sulfonic acid-based anionic surfactant is particularly preferred.

As the anionic surfactant, any of carboxylic acid-based, sulfate ester-based, sulfonic acid-based, and phosphate ester-based anionic surfactants may be used. Examples thereof include fatty acid salt, rosinate, naphthenate, ether carboxylate, alkenyl succinate, primary alkyl sulfate, secondary alkyl sulfate, alkyl sulfate polyoxyethylene salt, alkyl phenyl polyoxyethylene sulfate, monoacyl glycerol sulfate, acylamino sulfate ester salt, sulfated oil, sulfated fatty acid alkyl ester, α-olefin sulfonate, secondary alkane sulfonate, α-sulfo fatty acid salt, acyl isethionate, dialkyl sulfosuccinate, alkyl benzene sulfonate, alkyl naphthalene sulfonate, alkyl diphenyl ether disulfonate, petroleum sulfonate, lignin sulfonate, alkyl phosphate, alkyl polyoxyethylene phosphate, alkylphenyl polyoxyethylene phosphate, perfluoroalkyl carboxylate, perfluoroalkyl sulfonate, and perfluoroalkyl phosphate ester.

The amphoteric surfactant refers to a surfactant having both a cation group and an anion group in the molecular structure thereof, and having charge separation within the molecular structure, but no charge as a whole molecule.

Examples of the amphoteric surfactant include N-alkyl nitrilotriacetic acid, N-alkyl dimethyl betaine, N-alkyloxymethyl-N, N-diethylbetaine, N-alkylsulfobetaine, N-alkylhydroxysulfobetaine, lecithin, and perfluoroalkyl sulfonamide alkyl betaine.

Examples of the cationic surfactant include N-acylamine salts, quaternary ammonium salts, and imidazolium salts. Specific examples thereof include fatty acid polyethylene polyamide, amide, an alkyl trimethyl ammonium salt, a dialkyl dimethyl ammonium salt, an alkyldimethylbenzylammonium salt, an alkylpyridinium salt, an acylaminoethylmethyldiethylammonium salt, an acylaminopropyldimethylbenzylammonium salt, an acylaminopropyldimethylhydroxyethylammonium salt, an acylaminoethylpyridinium salt, a diacylaminoethylammonium salt, a diacyloxyethyl methyl hydroxyethyl ammonium salt, an alkyloxymethyl pyridinium salt, and a 1-acylaminoethyl-2-alkylimidazolium salt.

Examples of the nonionic surfactant include esters obtained by ester-bonding a polyhydric alcohol and a fatty acid, ethers such as polyoxyethylene alkyl ether and polyoxyethylene alkylphenyl ether, polyoxyethylene polyoxypropylene glycol, fatty acid added with ethylene oxide, polyhydric alcohol fatty acid ester added with ethylene oxide, fatty acid alkanolamide obtained by bonding a hydrophobic group and a hydrophilic group via an amide bond, and alkyl polyglycoside.

The anionic surfactant, the amphoteric surfactant, the cationic surfactant, and the nonionic surfactant are not limited to those listed above. In addition to the above, known anionic surfactants, amphoteric surfactants, cationic surfactants, and nonionic surfactants may be used.

The amount of the base used in the dissolving or melting step is preferably 0.001 to 10 parts by mass, more preferably 0.005 to 5 parts by mass, still more preferably 0.1 to 2 parts by mass, and particularly preferably 0.01 to 1 part by mass, based on 100 parts by mass of the polyester resin. Within the above range, the emulsification dispersibility is excellent, and the transferability of the thermoplastic resin particle is more excellent.

The amount of the surfactant used in the dissolving or melting step is preferably 0.1 to 20 parts by mass, more preferably 0.5 to 10 parts by mass, and still more preferably 1 to 5 parts by mass, based on 100 parts by mass of the polyester resin. Within the above range, the emulsification dispersibility is excellent, and the transferability of the thermoplastic resin particle is more excellent.

—Emulsification Step—

The method for producing the resin fine particle according to the exemplary embodiment includes an emulsification step of emulsifying the dissolved or molten oily mixture by adding a surfactant and an aqueous medium while applying a shearing force thereto to prepare a dispersion liquid of the resin fine particle.

From the viewpoints of the dispersibility of the basic dye in the resin fine particle, the dispersibility of the resin fine particle, and the color developing density, the pH of the dispersion liquid is preferably 6 or more and 12 or less, and more preferably 7 or more and 11 or less.

The emulsion-dispersion in the emulsification step is preferably performed by using phase inversion emulsification. That is, in the emulsification step, it is preferable to continuously or sequentially add an aqueous medium to the dissolved mixture or molten mixture to emulsion-disperse the mixture, it is more preferable to sequentially add an aqueous medium to the dissolved mixture or molten mixture twice or more to emulsion-disperse the mixture, and it is particularly preferable to sequentially add an aqueous medium to the dissolved mixture or molten mixture three times or more to emulsion-disperse the mixture.

The emulsion-dispersion in the emulsification step is performed while applying a shearing force to the dissolved mixture or molten mixture. In the emulsification step, it is preferable to use a mixing tank equipped with a stirrer, an extruder or a kneader. For example, it is preferable to apply a shearing force to the dissolved mixture or molten mixture with a screw of an extruder or a blade of a kneader.

Examples of the surfactant include those mentioned above.

The amount of the surfactant used in the emulsification step is preferably 0.1 to 20 parts by mass, more preferably 0.5 to 10 parts by mass, and still more preferably 1 to 5 parts by mass, based on 100 parts by mass of the polyester resin. Within the above range, the emulsification dispersibility is excellent, and the transferability is more excellent when the resin fine particle is used as a toner.

Examples of the aqueous medium for use in the exemplary embodiment include water such as distilled water and ion-exchanged water, and alcohols such as ethanol and methanol. Among these, ethanol and water are preferred, and water such as distilled water and ion-exchanged water is particularly preferred. The aqueous medium may be used alone or in combination of two or more thereof.

In addition, the aqueous medium may contain a water-miscible organic solvent, but it is preferable not to include the water-miscible organic solvent in the emulsification step.

The amount of the aqueous medium used in the emulsification step is not particularly limited, and may be appropriately selected depending on the solid content concentration of the obtained resin fine particle dispersion liquid.

The solid content concentration of the obtained resin fine particle dispersion liquid may be appropriately selected as necessary, and is preferably 1 mass % or more and 60 mass % or less, more preferably 5 mass % or more and 50 mass % or less, and particularly preferably 10 mass % or more and 50 mass % or less.

The emulsification temperature in the emulsification step is not particularly limited, and is preferably 20° C. to 150° C., and more preferably 30° C. to 100° C. from the viewpoint of the emulsification dispersibility in the emulsification step.

In the case of using a molten mixture, the emulsification temperature in the emulsification step is preferably a temperature higher than or equal to the glass transition temperature Tg of an amorphous resin, and more preferably a temperature higher than or equal to "Tg of the amorphous resin+5° C.".

The emulsification method for use in the emulsification step is not particularly limited, and a known disperser or emulsification device may be used. Examples thereof include a mixing tank equipped with a stirrer, a kneader, a homogenizer, a homomixer, a pressure kneader, an extruder, a media disperser, and a single-screw or twin-screw extruder.

Among these, a mixing tank equipped with a stirrer, an extruder and a kneader are preferred.

The emulsification device for use in the emulsification step is not particularly limited to a batch type or a continuous type, and a twin-screw extruder may be preferably mentioned.

The method for producing the resin fine particle according to the exemplary embodiment may include other steps in addition to the dissolving or melting step and the emulsification step.

The other steps are not particularly limited, and known steps may be performed as necessary, and examples thereof include a step of cooling the obtained resin fine particle dispersion liquid.

If necessary, the resin fine particle may be separated from the resin fine particle dispersion liquid by filtration or the like and dried to obtain the resin fine particle.

<Thermoplastic Resin Particle>

The thermoplastic resin particle according to the first exemplary embodiment relates to a thermoplastic resin particle containing a polyester resin and a basic dye, in which an average distance $X^D$ between adjacent domains containing the basic dye in the cross section of the thermoplastic resin particle satisfies the following expression L:

$$0.01\times D_{50v}\leq X^D\leq 0.4\times D_{50v} \qquad \text{Expression L.}$$

$D_{50v}$ represents the volume average particle diameter of the thermoplastic resin particle.

Thermoplastic resin particle according to the second exemplary embodiment relates to a thermoplastic resin particle obtained by at least aggregating and coalescing the resin fine particles according to the exemplary embodiment.

In the present description, unless otherwise specified, the "thermoplastic resin particle according to the exemplary embodiment" or simply the "thermoplastic resin particle" refers to both the first exemplary embodiment and the second exemplary embodiment described above.

As a result of the intensive study of the present inventors, it is found that, in the thermoplastic resin particle in the related art, the dispersibility of the resin fine particle containing a basic dye may be not sufficient, resulting in a low color developing density.

With the above configuration, an image having a high color developing density may be obtained from the thermoplastic resin particle according to the exemplary embodiment. The reason for the above effect is not clear, but it is presumed that the reason is as follows.

The aggregated and coalesced resin fine particles contain a polyester resin and a basic dye, and has a volume average particle diameter of 0.05 μm or more and 1 μm or less and a ratio of the concentration of the basic dye in the center of gravity portion of the resin fine particles to the concentration of the basic dye in the surface layer portion having a depth of 10 nm or less from the surface of the resin fine particle of 0.8 or more, or an average distance $X^D$ between adjacent basic dye-containing domains on the cross section of the thermoplastic resin particle satisfying the expression L. Therefore, a thermoplastic resin particle having excellent dispersibility of resin fine particle containing a basic dye and less uneven distribution of dye may be obtained, and an image having a high color developing density may be obtained.

The thermoplastic resin particle according to the exemplary embodiment is preferably used as a thermoplastic fluorescent resin particle.

The thermoplastic resin particle according to the exemplary embodiment is preferably used as an electrostatic charge image developing toner.

The thermoplastic resin particle contains a polyester resin, a basic dye, and, if necessary, a release agent and other additives, and preferably contains a polyester resin, a basic dye, and a release agent.

In the thermoplastic resin particle according to the first exemplary embodiment, the average distance $X^D$ between adjacent basic dye-containing domains in the cross section of the thermoplastic resin particle satisfies the following expression L:

$$0.01\times D_{50v}\leq X^D\leq 0.4\times D_{50v} \quad \text{Expression L.}$$

$D_{50v}$ represents the volume average particle diameter of the thermoplastic resin particle.

In the thermoplastic resin particle according to the second exemplary embodiment, the average distance $X^D$ between adjacent basic dye-containing domains in the cross section of the thermoplastic resin particle preferably satisfies the expression L, from the viewpoint of the color developing density.

The average distance $X^D$ between adjacent basic dye-containing domains in the cross section of the thermoplastic resin particle is measured according to the following method.

A sample is prepared by embedding the thermoplastic resin particle in a resin. A section is prepared from the prepared sample using a microtome. The position of the dye is specified by observing the cross section. As an analytical method for specifying the position of the basic dye-containing domain, a method of staining and observing with an electron microscope, or an element mapping method using energy dispersive X-ray analysis (EDX), time-of-flight secondary ion mass spectrometry (TOF-SIMS), and auger electron spectroscopy (AES) is used. The distance between the basic dye-containing domains is measured as a distance between the centers of gravity of respective basic dye-containing domains. The average distance $X^D$ between the domains is obtained by measuring the average distance between basic dye-containing domains in one thermoplastic resin particle, performing the above operation by observing cross sections of 50 or more thermoplastic resin particles and calculating an average value.

In the thermoplastic resin particle according to the first exemplary embodiment, the average distance $X^D$ between adjacent basic dye-containing domains in the cross section of the thermoplastic resin particle preferably satisfies the following expression L1, and more preferably satisfies the following expression L2, from the viewpoint of the color developing density.

$$0.03\times D_{50v}\leq X^D\leq 0.30\times D_{50v} \quad \text{Expression L1}$$

$$0.05\times D_{50v}\leq X^D\leq 0.20\times D_{50v} \quad \text{Expression L2}$$

$D_{50v}$ represents the volume average particle diameter of the thermoplastic resin particle.

Further, in the thermoplastic resin particle according to the second exemplary embodiment, the average distance $X^D$ between adjacent basic dye-containing domains in the cross section of the thermoplastic resin particle more preferably satisfies the above expression L1, and particularly preferably satisfies the above expression L2, from the viewpoint of the color developing density.

In the thermoplastic resin particle according to the exemplary embodiment, the average distance $X^D$ between adjacent basic dye-containing domains in the cross section of the thermoplastic resin particle is preferably 0.05 μm or more and 3.0 μm or less, more preferably 0.08 μm or more and 2.5 μm or less, and particularly preferably 0.2 μm or more and 1.0 μm or less, from the viewpoint of the color developing density.

Further, the thermoplastic resin particle according to the first exemplary embodiment is preferably a thermoplastic resin particle obtained by at least aggregating and coalescing the resin fine particles according to the exemplary embodiment.

Preferred examples of the polyester resin and the basic dye contained in the thermoplastic resin particle according to the exemplary embodiment are the same as the preferred examples described above for the resin fine particle according to the exemplary embodiment.

In the thermoplastic resin particle according to the exemplary embodiment, in the cross section of the thermoplastic resin particle, the ratio of the concentration of the basic dye in the center of gravity portion of the basic dye-containing domain to the concentration of the basic dye in the surface layer portion having a depth of 10 nm or less from the surface of the basic dye-containing domain is preferably 0.8 or more, more preferably 0.85 or more, still more preferably 0.9 or more, and particularly preferably 0.92 or more and 1.0 or less, from the viewpoints of the dispersibility of the basic dye in the resin fine particle, the dispersibility of the resin fine particle, and the color developing density.

The ratio of the concentration of the basic dye in the basic dye-containing domain in the cross section of the thermoplastic resin particle is measured in the same manner as the ratio of the concentration of the basic dye in the center of gravity portion of the resin fine particle to the concentration of the basic dye in the surface layer portion having a depth of 10 nm or less from the surface of the resin fine particle in the resin fine particle. Further, the confirmation of the basic dye-containing domain may also refer to the measurement of the average distance $X^D$ between adjacent basic dye-containing domains in the cross section of the thermoplastic resin particle described above.

—Colorants Other than Basic Dye—

The thermoplastic resin particle according to the exemplary embodiment may contain a colorant (hereinafter, referred to as "other colorants") other than the basic dye.

As the other colorants, known colorants may be used.

The other colorants are preferably a colorant that does not exhibit fluorescence in the visible light region.

Further, the other colorants may be a pigment or a dye, and is preferably a pigment.

Specific examples of the other colorants include: magenta pigments such as C. I. Pigment Red 1, C. I. Pigment Red 2, C. I. Pigment Red 3, C. I. Pigment Red 4, C. I. Pigment Red 5, C. I. Pigment Red 6, C. I. Pigment Red 7, C. I. Pigment Red 8, C. I. Pigment Red 9, C. I. Pigment Red 10, C. I. Pigment Red 11, C. I. Pigment Red 12, C. I. Pigment Red 14, C. I. Pigment Red 15, C. I. Pigment Red 16, C. I. Pigment Red 17, C. I. Pigment Red 18, C. I. Pigment Red 21, C. I. Pigment Red 22, C. I. Pigment Red 23, C. I. Pigment Red 31, C. I. Pigment Red 32, C. I. Pigment Red 38, C. I. Pigment Red 41, C. I. Pigment Red 48, C. I. Pigment Red 48:1, C. I. Pigment Red 48:2, C. I. Pigment Red 48:3, C. I. Pigment Red 48:4, C. I. Pigment Red 49, C. I. Pigment Red 52, C. I. Pigment Red 53:1, C. I. Pigment Red 54, C. I. Pigment Red 57:1, C. I. Pigment Red 58, C. I. Pigment Red 60:1, C. I. Pigment Red 63, C. I. Pigment Red 64:1, C. I. Pigment Red 68, C. I. Pigment Red 81:1, C. I. Pigment Red 81:4, C. I. Pigment Red 83, C. I. Pigment Red 88, C. I. Pigment Red 89, C. I. Pigment Red 112, C. I. Pigment Red 114, C. I. Pigment Red 122, C. I. Pigment Red 123, C. I. Pigment Red 144, C. I. Pigment Red 146, C. I. Pigment Red 149, C. I. Pigment Red 150, C. I. Pigment Red 166, C. I. Pigment Red 170, C. I. Pigment Red 176, C. I. Pigment Red 177, C. I. Pigment Red 178, C. I. Pigment Red 179, C. I. Pigment Red 184, C. I. Pigment Red 185, C. I. Pigment Red 187, C. I. Pigment Red 202, C. I. Pigment Red 206, C. I. Pigment Red 207, C. I. Pigment Red 208, C. I. Pigment Red 209, C. I. Pigment Red 210, C. I. Pigment Red 220, C. I. Pigment Red 221, C. I. Pigment Red 238, C. I. Pigment Red 242, C. I. Pigment Red 245, C. I. Pigment Red 253, C. I. Pigment Red 254, C. I. Pigment Red 255, C. I. Pigment Red 256, C. I. Pigment Red 258, C. I. Pigment Red 264, C. I. Pigment Red 266, C. I. Pigment Red 269, and Pigment Violet 19; magenta dyes such as C. I. Solvent Red 1, C. I. Solvent Red 3, C. I. Solvent Red 8, C. I. Solvent Red 23, C. I. Solvent Red 24, C. I. Solvent Red 25, C. I. Solvent Red 27, C. I. Solvent Red 30, C. I. Solvent Red 49, C. I. Solvent Red 52, C. I. Solvent Red 58, C. I. Solvent Red 63, C. I. Solvent Red 81, C. I. Solvent Red 82, C. I. Solvent Red 83, C. I. Solvent Red 84, C. I. Solvent Red 100, C. I. Solvent Red 109, C. I. Solvent Red 111, C. I. Solvent Red 121, C. I. Solvent Red 122, C. I. Disperse Red 9, C. I. Basic red 1, C. I. Basic Red 2, C. I. Basic Red 9, C. I. Basic Red 12, C. I. Basic Red 13, C. I. Basic Red 14, C. I. Basic Red 15, C. I. Basic Red 17, C. I. Basic Red 18, C. I. Basic Red 22, C. I. Basic Red 23, C. I. Basic Red 24, C. I. Basic Red 27, C. I. Basic Red 29, C. I. Basic Red 32, C. I. Basic Red 34, C. I. Basic Red 35, C. I. Basic Red 36, C. I. Basic Red 37, C. I. Basic Red 38, C. I. Basic Red 39, and C. I. Basic Red 40; and various pigments or various dyes such as Red iron oxide, Cadmium Red, Red lead, mercury sulfide, Permanent red 4R, Resole Red, Pyrazolone Red, Watching Red, calcium salt, Lake Red D, Brilliant Carmine 6B, Eosin Lake, Rotamine Rake B, Alizarin Rake, Brilliant Carmine 3B, Carbon Black, Chrome Yellow, Hansa Yellow, Benzidine Yellow, Slene Yellow, Quinoline Yellow, Pigment Yellow, Permanent Orange GTR, Pyrazolone Orange, Balkan Orange, Brilliant Carmine 3B, Brilliant Carmine 6B, DuPont Oil Red, Lake Red C, Aniline Blue, Ultramarine Blue, Chalco oil blue, methylene blue chloride, Phthalocyanine blue, Pigment blue, Phthalocyanine green, and Malachite green oxalate.

The other colorants are appropriately selected according to the desired color. For example, when it is desired to express fluorescence pink, an example is to contain a magenta pigment.

The other colorants may be used alone or in combination of two or more thereof. When used in combination, it is preferable that two or more types of colorants having different maximum absorption wavelengths in the visible light region are used.

As the other colorants, a surface-treated colorant may be used as necessary, or the other colorants may be used in combination with a dispersant. In addition, a plurality of types of colorants may be used in combination.

The content of the other colorants is preferably 0.1 mass % or more and 30 mass % or less, more preferably 0.2 mass % or more and 15 mass % or less, and particularly preferably 0.3 mass % or more and 5 mass % or less based on the whole thermoplastic resin particle, from the viewpoints of the fluorescence intensity and tint.

The value of the ratio WB/WA of the content WB of the other colorants to the content WA of the basic dye in the thermoplastic resin particle is preferably 0.5 or more and 10 or less, more preferably 0.8 or more and 5 or less, and particularly preferably 0.8 or more and 1.5 or less, from the viewpoints of the fluorescence intensity and tint.

—Other Binder Resins—

The thermoplastic resin particle according to the exemplary embodiment may contain a binder resin (hereinafter, referred to as "other binder resins") other than the polyester resin contained in the resin fine particle.

Examples of the other binder resins include vinyl-based resins obtained from a homopolymer of monomers such as styrenes (such as styrene, parachlorostyrene, and α-methylstyrene), (meth)acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene), or a copolymer combining two or more of these monomers.

Examples of the other binder resins also include polyester resins other than the polyester resin contained in the resin fine particle, non-vinyl-based resins such as an epoxy resin, a polyurethane resin, a polyamide resin, a cellulose resin, a polyether resin, and a modified rosin, a mixture of these non-vinyl-based resins and the vinyl-based resins, or a graft polymer obtained by polymerizing a vinyl-based monomer in the coexistence of these non-vinyl-based resins.

These other binder resins may be used alone or in combination of two or more thereof.

The weight average molecular weight Mw of the other binder resins is preferably 5,000 or more and 1,000,000 or less, more preferably 7,000 or more and 500,000 or less, and particularly preferably 25,000 or more and 60,000 or less, from the viewpoint of scratch resistance of the image. The number average molecular weight Mn of the other binder resins is preferably 2,000 or more and 100,000 or less. The molecular weight distribution Mw/Mn of the other binder resins is preferably 1.5 or more and 100 or less, and more preferably 2 or more and 60 or less.

The weight average molecular weight and the number average molecular weight of the other binder resins are measured by gel permeation chromatography (GPC). The molecular weight is measured by GPC by using a GPC HLC-8120GPC manufactured by Tosoh Corporation as a measurement device, a column TSKgel Super HM-M (15 cm) manufactured by Tosoh Corporation, and a tetrahydrofuran (THF) solvent. The weight average molecular weight and the number average molecular weight are calculated from the measurement result using a molecular weight calibration curve prepared using a monodispersed polystyrene standard sample.

The total content of the polyester resin contained in the resin fine particle and the other binder resins is preferably 40 mass % or more and 95 mass % or less, more preferably 50 mass % or more and 90 mass % or less, and still more preferably 60 mass % or more and 85 mass % or less, based on the whole thermoplastic resin particle.

—Release Agent—

Examples of the release agent include: gydrocarbon wax; natural wax such as carnauba wax, rice wax, and candelilla wax; synthetic wax or mineral or petroleum wax such as montan wax; and ester wax such as fatty acid ester and montanic acid ester. The release agent is not limited thereto.

The melting temperature of the release agent is preferably 50° C. or higher and 110° C. or lower, and more preferably 60° C. or higher and 100° C. or lower.

The melting temperature is obtained from the DSC curve obtained by differential scanning calorimetry (DSC) according to the "melting peak temperature" described in JIS K 7121-1987 "Method for measuring transition temperature of plastics", which is a method for obtaining the melting temperature.

The content of the release agent is preferably 1 mass % or more and 20 mass % or less, and more preferably 5 mass % or more and 15 mass % or less, based on the whole thermoplastic resin particle.

—Other Additives—

Examples of other additives include known additives such as magnetic materials, charge control agents, and inorganic powders. These additives are contained in the thermoplastic resin particle as internal additives.

—Characteristics of Thermoplastic Resin Particle—

The thermoplastic resin particle may be a thermoplastic resin particle having a single-layer structure, or a so-called core-shell structure thermoplastic resin particle (a core-shell type particle) composed of a core portion (a core particle) and a coating layer (a shell layer) for coating the core portion. The core-shell structure thermoplastic resin particle includes, for example, a core portion containing a binder resin and, if necessary, a colorant and a release agent, and a coating layer containing the binder resin.

The volume average particle diameter $D_{50}$ of the thermoplastic resin particle is preferably 2 μm or more and 10 μm or less, more preferably 4 μm or more and 8 μm or less, and particularly preferably 4 μm or more and 7 μm or less.

The volume average particle diameter of the thermoplastic resin particle is measured using a Coulter Multisizer II (manufactured by Beckman Coulter, Inc.) and the electrolytic solution is measured using ISOTON-II (manufactured by Beckman Coulter, Inc.).

In the measurement, 0.5 mg or more and 50 mg or less of a measurement sample is added to 2 mL of a 5 mass % aqueous solution of a surfactant (preferably sodium alkylbenzenesulfonate) as a dispersant. The obtained mixture is added to 100 mL or more and 150 mL or less of the electrolytic solution.

The electrolytic solution in which the sample is suspended is subjected to a dispersion treatment for 1 minute with an ultrasonic disperser, and the Coulter Multisizer II is used to measure the particle diameter of particles having a particle diameter in the range of 2 μm or more and 60 μm or less using an aperture having an aperture diameter of 100 μm. 50,000 particles are sampled.

With respect to the measured particle diameter, a cumulative distribution by volume is drawn from the side of the small diameter, and the particle diameter corresponding to the cumulative percentage of 50% is defined as the volume average particle diameter $D_{50v}$.

In the exemplary embodiment, the average circularity of the thermoplastic resin particle is not particularly limited, and is preferably 0.91 or more and 0.98 or less, more preferably 0.94 or more and 0.98 or less, and still more preferably 0.95 or more and 0.97 or less, from the viewpoint of improving the cleaning property of an image carrier in the case of being used as a toner.

In the exemplary embodiment, the circularity of the thermoplastic resin particle is (the perimeter of a circle having the same area as a particle projection image)/(the perimeter of a particle projection image), and the average circularity of the thermoplastic resin particle is the circularity corresponding to the cumulative percentage of 50% from the smaller side in a cumulative distribution. The average circularity of the thermoplastic resin particle is obtained by analyzing at least 3,000 thermoplastic resin particles with a flow type particle image analyzer.

The average circularity of the thermoplastic resin particle may be controlled by adjusting the stirring speed of the dispersion liquid, the temperature of the dispersion liquid, or the holding time in the fusion and coalesce step, for example, when the thermoplastic resin particle is produced by an aggregation and coalescence method.

(External Additive)

When the thermoplastic resin particle is used as an electrostatic charge image developing toner described below, the thermoplastic resin particle may contain an external additive, if necessary.

The thermoplastic resin particle may be a thermoplastic resin particle containing no external additive, or a thermoplastic resin particle externally added with an external additive.

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO\cdot SiO_2$, $K_2O(TiO_2)_n$, $Al_2O_3\cdot 2SiO_2$, $CaCO_3$, $MgCO_3$, $BaSO_4$, and $MgSO_4$.

The surface of the inorganic particles as an external additive is preferably subjected to a hydrophobic treatment. The hydrophobic treatment is performed, for example, by immersing the inorganic particles in a hydrophobic treatment agent. The hydrophobic treatment agent is not particularly limited, and examples thereof include a silane coupling agent, a silicone oil, a titanate coupling agent, and an aluminum coupling agent. The hydrophobic treatment agent may be used alone or in combination of two or more thereof.

The amount of the hydrophobic treatment agent is, for example, preferably 1 part by mass or more and 10 parts by mass or less based on 100 parts by mass of the inorganic particles.

Examples of the external additive include resin particles (such as polystyrene, polymethylmethacrylate (PMMA), and melamine resin), and cleaning activators (such as metal salts of higher fatty acids typified by zinc stearate, and particles of fluoropolymer).

The amount of the external additive is, for example, preferably 0.01 mass % or more and 10 mass % or less, and more preferably 0.01 mass % or more and 6 mass % or less, based on the thermoplastic resin particle.

<Use of Thermoplastic Resin Particle>

The thermoplastic resin particle according to the exemplary embodiment is preferably used as an image forming thermoplastic resin particle, and more preferably used as an electrostatic charge image developing toner.

In addition, the thermoplastic resin particle according to the exemplary embodiment is also preferably used as a powder paint. The powder paint may be also used for producing a coated product. A surface to be coated are coated with the powder paint and then heated (baked) the surface to form a coating film in which the powder paint is hardened so as to produce a coated product. In this case, the coating and heating (baking) may be performed collectively.

For the powder coating, well-known coating methods such as spray coating, electrostatic powder coating, triboelectric powder coating, and fluidized dipping may be used. The thickness of the coating film of the powder is preferably 30 μm or more and 50 μm or less, for example.

The heating temperature (baking temperature) is, for example, preferably 90° C. or higher and 250° C. or lower, more preferably 100° C. or higher and 220° C. or lower, and still more preferably 120° C. or higher and 200° C. or lower.

The heating time (baking time) is adjusted according to the heating temperature (baking temperature).

The target article to be coated with the powder is not particularly limited, and examples thereof include various kinds of metal parts, ceramic parts, and resin parts. These target articles may be unmolded articles before being formed into respective articles such as plate-like articles and linear articles, or may be molded articles formed for electronic parts, road vehicles, building interior and exterior materials, or the like. The target article may be an article whose surface to be coated has been subjected to a surface treatment such as a primer treatment, a plating treatment, and electrodeposition coating in advance.

Besides, in the fields other than coating, the thermoplastic resin particle according to the exemplary embodiment is also preferably used as a resin particle for a toner display.

A toner display in which charged thermoplastic resin particles are dispersed in a medium (often air) and an image is displayed by moving the resin particles by an electric field is known. The thermoplastic resin particle according to the exemplary embodiment may be adopted in such a toner display without problems. For example, an image is displayed by charging resin particles into a cell sandwiched between two transparent electrodes and applying a voltage to move the thermoplastic resin particles.

[Method for Producing Thermoplastic Resin Particles]

Next, a method for producing the thermoplastic resin particle according to the exemplary embodiment will be described.

The thermoplastic resin particle according to the exemplary embodiment may be obtained by producing a thermoplastic resin particle and then externally adding an external additive to the thermoplastic resin particle.

The thermoplastic resin particle may be produced by either a dry production method (for example, a kneading pulverization method) or a wet production method (for example, an aggregation and coalescence method, a suspension polymerization method, and a dissolution suspension method). These production methods are not particularly limited and known production methods are adopted. Among these, the thermoplastic resin particle is preferably obtained by the aggregation and coalescence method.

Examples of the aggregation and coalescence method include the methods described in JP-A-2010-97101 and JP-A-2006-154641.

Examples of the kneading pulverization method include the method described in JP-A-2000-267338.

Examples of the dissolution suspension method include the method described in JP-A-2000-258950.

Specifically, in the case of producing the thermoplastic resin particle by the aggregation and coalescence method, the thermoplastic resin particle is produced by, for example, a step of preparing a resin particle dispersion liquid in which binder resin particles are dispersed (resin particle dispersion liquid preparation step), a step of aggregating resin particles and if necessary other particles in the resin particle dispersion liquid or a dispersion liquid after mixing other particle dispersion liquids, if necessary, to form aggregated particles (aggregated particle forming step), and a step of heating an aggregated particle dispersion liquid in which the aggregated particles are dispersed to fuse and coalesce the aggregated particles to form thermoplastic resin particles (fusion and coalesce step).

Hereinafter, the details of each step will be described.

In the following description, a method for obtaining a thermoplastic resin particle containing a colorant and a release agent will be described, but the release agent is used as necessary. Of course, other additives other than the colorant and the release agent may be used.

—Resin Particle Dispersion Liquid Preparation Step—

A colorant particle dispersion liquid in which colorant particles are dispersed and a release agent particle dispersion liquid in which release agent particles are dispersed are prepared together with a resin particle dispersion liquid in which binder resin particles are dispersed.

In addition, in the method for producing the thermoplastic resin particle according to the exemplary embodiment, a resin particle dispersion liquid containing the resin fine particle according to the exemplary embodiment is preferably used as the colorant particle dispersion liquid.

The resin particle dispersion liquid is prepared, for example, by dispersing resin particles in a dispersion medium with a surfactant.

Examples of the dispersion medium for use in the resin particle dispersion liquid include an aqueous medium.

Examples of the aqueous medium include water such as distilled water and ion-exchanged water, and alcohols. The aqueous medium may be used alone or in combination of two or more thereof.

Examples of the surfactant include: sulfate ester salt-based, sulfonate-based, phosphate ester-based, and soap-based anionic surfactants; amine salt-based and quaternary ammonium salt-based cationic surfactants; and polyethylene glycol-based, alkylphenol ethylene oxide adduct-based, and polyhydric alcohol-based nonionic surfactants. Among these, anionic surfactants and cationic surfactants are particularly preferred. The nonionic surfactant may be used in combination with an anionic surfactant or a cationic surfactant.

Among these, it is preferable to use a nonionic surfactant, and it is preferable to use a nonionic surfactant in combination with an anionic surfactant or a cationic surfactant.

The surfactant may be used alone or in combination of two or more thereof.

For the resin particle dispersion liquid, examples of a method of dispersing the resin particles in the dispersion medium include general dispersion methods using a rotary shearing homogenizer, a ball mill having a medium, a sand mill, and a dyno mill, or the like. Depending on the type of the resin particles, the resin particles may be dispersed in the dispersion medium by using a phase inversion emulsification method. The phase inversion emulsification method is a method of dispersing a resin in an aqueous medium in the form of particles by dissolving a resin to be dispersed in a hydrophobic organic solvent in which the resin is soluble, adding a base to the organic continuous phase (O phase) for neutralization, and then adding an aqueous medium (W phase) to change the phase from W/O to O/W.

The volume average particle diameter of the resin particles dispersing in the resin particle dispersion liquid is preferably, for example, 0.01 μm or more and 1 μm or less, more preferably 0.08 μm or more and 0.8 μm or less, and still more preferably 0.1 μm or more and 0.6 μm or less.

Regarding the volume average particle diameter of the resin particles, a cumulative distribution by volume is drawn from the side of the smallest diameter with respect to particle diameter ranges (so-called channels) separated using the particle diameter distribution obtained by the measurement of a laser diffraction-type particle diameter distribution measurement device (for example, LA-700 manufactured by Horiba, Ltd.), and a particle diameter corresponding to the cumulative percentage of 50% with respect to the entire particles is set as a volume average particle diameter $D_{50v}$.

The volume average particle diameter of the particles in other dispersion liquids is measured in the same manner.

The content of the resin particles contained in the resin particle dispersion liquid is preferably 5 mass % or more and 50 mass % or less, and more preferably 10 mass % or more and 40 mass % or less.

For example, the release agent particle dispersion liquid is prepared in the same manner as the resin particle dispersion liquid. That is, regarding the volume average particle diameter of particles, the dispersion medium, the dispersion method, and the content of the particles in the resin particle dispersion liquid, the same applies to the release agent particles dispersed in the release agent particle dispersion liquid.

—Aggregated Particle Forming Step—

Next, the resin particle dispersion liquid, the colorant particle dispersion liquid, and the release agent particle dispersion liquid are mixed.

Then, in the mixed dispersion liquid, the resin particles, the colorant particles, and the release agent particles are hetero-aggregated to form aggregated particles containing the resin particles, the colorant particles, and the release agent particles and having a diameter close to the diameter of the target thermoplastic resin particles.

In addition, in the aggregated particle forming step of the method for producing the thermoplastic resin particle according to the exemplary embodiment, a resin particle dispersion liquid containing the resin fine particle according to the exemplary embodiment is preferably used as the colorant particle dispersion liquid.

Specifically, for example, an aggregating agent is added to the mixed dispersion liquid, the pH of the mixed dispersion liquid is adjusted to acidic (e.g., a pH of 2 or more and 5 or less), and a dispersion stabilizer is added if necessary. Then, the resin particles are heated to a temperature, specifically, for example, "the glass transition temperature of resin particles −30° C." or higher and "the glass transition temperature of resin particles −10° C." or lower, close to the glass transition temperature to aggregate the particles dispersed in the mixed dispersion liquid, and thus the aggregated particles are formed.

In the aggregated particle forming step, for example, while stirring the mixed dispersion liquid with a rotary shear homogenizer, an aggregating agent is added at room temperature (e.g., 25° C.), the pH of the mixed dispersion liquid is adjusted to acidic (e.g., a pH of 2 or more and 5 or less), and a dispersion stabilizer is added if necessary. Then, the heating may be performed.

Examples of the aggregating agent include a surfactant having a polarity opposite to that of the surfactant contained in the mixed dispersion liquid, an inorganic metal salt, and a divalent or higher metal complex. When a metal complex is used as the aggregating agent, the amount of the surfactant used is reduced and the charging characteristics are improved.

If necessary, an additive that forms a complex or a similar bond with the metal ion of the aggregating agent may be used in combination with the aggregating agent. A chelating agent is preferably used as the additive.

Examples of the inorganic metal salt include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include: oxycarboxylic acids such as tartaric acid, citric acid and gluconic acid; and aminocarboxylic acids such as iminodiacetic acid (IDA), nitrilotriacetic acid (NTA), and ethylenediaminetetraacetic acid (EDTA).

The amount of the aggregating agent added is preferably 0.01 part by mass or more and 5.0 parts by mass or less, and more preferably 0.1 part by mass or more and less than 3.0 parts by mass, based on 100 parts by mass of the resin particles.

—Fusion and Coalesce Step—

Next, the aggregated particle dispersion liquid in which the aggregated particles are dispersed is heated to, for example, a temperature equal to or higher than the glass transition temperature of the resin particles (e.g., a temperature higher than the glass transition temperature of the resin particles by 30° C. to 50° C.) and equal to or higher than the melting temperature of the release agent to fuse and coalesce the aggregated particles to form the thermoplastic resin particles.

In the fusion and coalesce step, at a temperature equal to or higher than the glass transition temperature of the resin particles and equal to or higher than the melting temperature of the release agent, the resin and the release agent are in a compatible state. Thereafter, the thermoplastic resin particles are obtained after cooling.

As a method of adjusting the aspect ratio of the release agent in the thermoplastic resin particles, the adjustment may be performed by promoting crystal growth by keeping the temperature around the freezing point of the release agent for a certain time during the cooling, or by promoting crystal growth by using two or more types of release agents with different melting temperatures during the cooling.

After the above steps, the thermoplastic resin particles are obtained.

The thermoplastic resin particles may also be produced by a step of forming second aggregated particles by obtaining an aggregated particle dispersion liquid in which aggregated particles are dispersed, and then further mixing the aggregated particle dispersion liquid and a resin particle dispersion liquid in which resin particles are dispersed to further adhere and aggregate the resin particles to the surface of the aggregated particles, and a step of forming core-shell structure thermoplastic resin particles by heating a second aggregated particle dispersion liquid in which the second aggregated particles are dispersed to fuse and coalesce the second aggregated particles.

After the fusion and coalesce step, the thermoplastic resin particles formed in the solution are subjected to known washing step, solid-liquid separation step, and drying step to obtain dried thermoplastic resin particles. In the washing step, from the viewpoint of chargeability, it is preferable to sufficiently perform displacement washing with ion-exchanged water. In the solid-liquid separation step, suction filtration, pressure filtration or the like may be performed from the viewpoint of productivity. In the drying step, freeze-drying, air-flow drying, fluidized drying, vibration-type fluidized drying or the like may be performed from the viewpoint of productivity.

The thermoplastic resin particle according to the exemplary embodiment may be produced, for example, by adding an external additive to the obtained dried thermoplastic resin particles and mixing the two. The mixing may be performed by, for example, a V blender, a Henschel mixer, or a Loedige mixer. Further, if necessary, coarse particles in the thermoplastic resin particles may be removed using a vibration sieving machine, a wind sieving machine or the like.

<Electrostatic Charge Image Developer>

When the thermoplastic resin particle according to the exemplary embodiment is used as an electrostatic charge image developer, a one-component developer containing only the thermoplastic resin particle according to the exemplary embodiment may be used, or a two-component developer obtained by mixing the thermoplastic resin particle and a carrier may be used.

The carrier is not particularly limited, and known carriers may be used. Examples of the carrier include a coated carrier obtained by coating a resin on the surface of a core material made of magnetic powder, a magnetic-powder-dispersed carrier obtained by dispersing and mixing magnetic powder in a matrix resin, and a resin-impregnated carrier obtained by impregnating a resin into porous magnetic powder. The magnetic-powder-dispersed carrier and the resin-impregnated carrier may be carriers in which constituent particles of the carrier are used as a core material and the surface of the core material is coated with a resin.

Examples of the magnetic powder include magnetic metals such as iron, nickel and cobalt; and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin containing an organosiloxane bond or a modified product thereof, a fluorine resin, a polyester, a polycarbonate, a phenol resin, and an epoxy resin. The coating resin and the matrix resin may contain an additive such as conductive particles. Examples of the conductive particles include particles of metals such as gold, silver and copper, carbon black, titanium oxide, zinc oxide, tin oxide, barium sulfate, aluminum borate and potassium titanate.

Among these, from the viewpoint of preventing density unevenness of the obtained image, a carrier obtained by coating the surface with a resin containing a silicone resin is preferred, and a carrier obtained by coating the surface with a silicone resin is more preferred.

To coat the surface of the core material with a resin, a method of coating the surface with a coating layer forming solution in which the coating resin and various additives (used as necessary) are dissolved in an appropriate solvent is used. The solvent is not particularly limited, and may be selected in consideration of the type of the resin used, coating suitability and the like. Specific examples of a resin coating method include an immersion method of immersing a core material in a coating layer forming solution, a spray method of spraying a coating layer forming solution on the surface of the core material, a fluidized bed method of spraying a coating layer forming solution while suspending the core material by fluidized air, and a kneader coater method of mixing a carrier core material and a coating layer forming solution in a kneader coater and then removing the solvent.

In the two-component developer, the mixing ratio (mass ratio) of the thermoplastic resin particles (electrostatic charge image developing toner) to the carrier is preferably thermoplastic resin particles (electrostatic charge image developing toner):carrier=1:100 to 30:100, and more preferably 3:100 to 20:100.

<Image Forming Apparatus and Image Forming Method>

An image forming apparatus and image forming method when the thermoplastic resin particle according to the exemplary embodiment is used as an electrostatic charge image developing toner will be described.

The image forming apparatus includes: an image carrier; a charging unit for charging the surface of the image carrier; an electrostatic charge image forming unit for forming an electrostatic charge image on the surface of the charged image carrier; a developing unit for storing an electrostatic charge image developer and developing, as a toner image, the electrostatic charge image formed on the surface of the image carrier by using the electrostatic charge image developer; a transfer unit for transferring the toner image formed on the surface of the image carrier onto the surface of a recording medium; and a fixing unit for fixing the toner image transferred on the surface of the recording medium. Then, the electrostatic charge image developer containing the thermoplastic resin particle according to the exemplary embodiment is applied as the electrostatic charge image developer.

In the image forming apparatus, an image forming method is performed, which includes: a charging step of charging the surface of the image carrier; an electrostatic charge image forming step of forming an electrostatic charge image on the surface of the charged image carrier; a development step of developing, as a toner image, the electrostatic charge image formed on the surface of the image carrier by using the electrostatic charge image developer containing the thermoplastic resin particle according to the exemplary embodiment; a transfer step of transferring the toner image formed on the surface of the image carrier onto the surface of the recording medium; and a fixing step of fixing the toner image transferred on the surface of the recording medium.

As the image forming apparatus, known image forming apparatuses are applied, for example, a direct transfer type apparatus that directly transfers the toner image formed on the surface of the image carrier onto the recording medium, an intermediate transfer type apparatus that primarily transfers the toner image formed on the surface of the image carrier onto the surface of an intermediate transfer body, and secondarily transfers the toner image transferred on the surface of the intermediate transfer body onto the surface of the recording medium, an apparatus including a cleaning unit for cleaning the surface of the image carrier before charging after the transfer of the toner image, and an apparatus including a charge removing unit for removing the charge by irradiating the surface of the image carrier before charging with removing light after the transfer of the toner image.

When the image forming apparatus is an intermediate transfer type apparatus, the transfer unit includes, for example, an intermediate transfer body with a toner image transferred onto the surface thereof, a primary transfer unit for primarily transferring the toner image formed on the surface of the image carrier onto the surface of the intermediate transfer body, and a secondary transfer unit for secondarily transferring the toner image transferred on the surface of the intermediate transfer body onto the surface of the recording medium.

In the image forming apparatus, for example, a portion including the developing unit may have a cartridge structure (process cartridge) that is attached to and detached from the image forming apparatus. As the process cartridge, for example, a process cartridge including a developing unit for storing the electrostatic charge image developer containing the thermoplastic resin particle according to the exemplary embodiment is preferably used.

Hereinafter, an example of the image forming apparatus will be described, but the image forming apparatus is not limited thereto. In the following description, the main parts shown in the drawings will be described, and description of the other parts will be omitted.

FIG. 1 is a schematic configuration diagram illustrating the image forming apparatus for use in the exemplary embodiment.

The image forming apparatus illustrated in FIG. 1 includes first to fourth electrophotographic image forming units 10Y, 10M, 10C, and 10K that output images of respective colors of yellow (Y), magenta (M), cyan (C), and black (K) based on image data subjected to color separation. These image forming units (hereinafter, also simply referred to as "units") 10Y, 10M, 10C, and 10K are arranged side by side in the horizontal direction with a predetermined distance therebetween. These units 10Y, 10M, 10C, and 10K may be process cartridges that are attached to and detached from the image forming apparatus.

Above the units 10Y, 10M, 10C, and 10K, an intermediate transfer belt 20 (an example of the intermediate transfer body) is extended through the units. The intermediate transfer belt 20 is provided around a drive roller 22 and a support roller 24, which are in contact with the inner surface of the intermediate transfer belt 20, and is configured to run in the direction from the first unit 10Y to the fourth unit 10K. A force is applied to the support roller 24 in a direction away from the drive roller 22 by a spring or the like (not illustrated), and tension is applied to the intermediate transfer belt 20 wound around the support roller 24 and the drive roller 22. An intermediate transfer belt cleaning device 30 is provided on an image carrying surface side of the intermediate transfer belt 20 so as to face the drive roller 22.

Developing devices 4Y, 4M, 4C, and 4K (an example of the developing unit) of the units 10Y, 10M, 10C, and 10K are supplied with yellow, magenta, cyan, and black toners stored in toner cartridges 8Y, 8M, 8C, and 8K, respectively.

Since the first to fourth units 10Y, 10M, 10C, and 10K have the same configuration and operation, here, the first unit 10Y, which is arranged on the upstream side in the running direction of the intermediate transfer belt and forms a yellow image, will be described as a representative.

The first unit 10Y includes a photoconductor 1Y functioning as an image carrier. Around the photoconductor 1Y, the following members are disposed in order: a charging roller 2Y (an example of the charging unit) for charging the surface of the photoconductor 1Y to a predetermined potential; an exposure device 3 (an example of the electrostatic charge image forming unit) for forming an electrostatic charge image by exposing the charged surface with a laser beam 3Y based on an image signal subjected to color separation; a developing device 4Y (an example of the developing unit) for developing the electrostatic charge image by supplying the charged toner to the electrostatic charge image; a primary transfer roller 5Y (an example of the primary transfer unit) for transferring the developed toner image onto the intermediate transfer belt 20; and a photoconductor cleaning device 6Y (an example of the image carrier cleaning unit) for removing the toner remaining on the surface of the photoconductor 1Y after the primary transfer.

The primary transfer roller 5Y is disposed inside the intermediate transfer belt 20 and is provided at a position facing the photoconductor 1Y. A bias power source (not illustrated) for applying a primary transfer bias is connected to each of the primary transfer rollers 5Y, 5M, 5C, and 5K of the respective units. Each bias power source changes the value of the transfer bias applied to each primary transfer roller under the control of a controller (not illustrated).

Hereinafter, the operation of forming a yellow image in the first unit 10Y will be described.

First, prior to the operation, the surface of the photoconductor 1Y is charged to a potential of −600 V to −800 V by using the charging roller 2Y.

The photoconductor 1Y is formed by laminating a photoconductive layer on a conductive substrate (e.g., having volume resistivity at 20° C. of $1\times10^{-6}$ Ωcm or less). The photoconductive layer generally has high resistance (resistance of general resin), but, has a property that when irradiated with a laser beam, the specific resistance of the portion irradiated with the laser beam changes. Therefore, the exposure device 3 irradiates the charged surface of the photoconductor 1Y with the laser beam 3Y according to yellow image data sent from the controller (not illustrated). Accordingly, an electrostatic charge image having a yellow image pattern is formed on the surface of the photoconductor 1Y.

The electrostatic charge image is an image formed on the surface of the photoconductor 1Y by charging, and is a so-called negative latent image formed by lowering the specific resistance of the portion of the photoconductive layer irradiated with the laser beam 3Y to flow a charge charged on the surface of the photoconductor 1Y and by, on the other hand, leaving a charge of a portion not irradiated with the laser beam 3Y.

The electrostatic charge image formed on the photoconductor 1Y rotates to a predetermined developing position as the photoconductor 1Y runs. Then, at this developing position, the electrostatic charge image on the photoconductor 1Y is developed and visualized as a toner image by the developing device 4Y.

In the developing device 4Y, for example, an electrostatic charge image developer containing at least a yellow toner and a carrier is stored. The yellow toner is frictionally charged by being stirred in the developing device 4Y, and has a charge of the same polarity (negative) as the charge charged on the photoconductor 1Y and is carried on a developer roller (an example of a developer carrier). Then, when the surface of the photoconductor 1Y passes through the developing device 4Y, the yellow toner electrostatically adheres to a discharged latent image portion on the surface of the photoconductor 1Y, and the latent image is developed by the yellow toner. The photoconductor 1Y on which the yellow toner image is formed continues to run at a predetermined speed, and the toner image developed on the photoconductor 1Y is conveyed to a predetermined primary transfer position.

When the yellow toner image on the photoconductor 1Y is conveyed to the primary transfer position, a primary transfer bias is applied to the primary transfer roller 5Y, an electrostatic force from the photoconductor 1Y to the primary transfer roller 5Y acts on the toner image, and the toner image on the photoconductor 1Y is transferred onto the intermediate transfer belt 20. The transfer bias applied at this time has a polarity (+) opposite to the polarity (−) of the toner, and is controlled to, for example, +10 μA by the controller (not illustrated) in the first unit 10Y. The toner remaining on the photoconductor 1Y is removed and collected by the photoconductor cleaning device 6Y.

The primary transfer bias applied to the primary transfer rollers 5M, 5C, and 5K at and after the second unit 10M is also controlled similar to the first unit.

In this way, the intermediate transfer belt 20 onto which the yellow toner image is transferred by the first unit 10Y is sequentially conveyed through the second to fourth units 10M, 10C, and 10K, and the toner images of the respective colors are superimposed and transferred in a multiple manner.

The intermediate transfer belt 20 onto which the toner images of four colors are transferred in a multiple manner through the first to fourth units arrives at a secondary transfer portion including the intermediate transfer belt 20, the support roller 24 in contact with the inner surface of the intermediate transfer belt, and a secondary transfer roller 26 (an example of the secondary transfer unit) disposed on the image carrying surface side of the intermediate transfer belt 20. On the other hand, recording paper P (an example of the recording medium) is fed through a supply mechanism into a gap where the secondary transfer roller 26 and the intermediate transfer belt 20 are in contact with each other at a predetermined timing, and a secondary transfer bias is applied to the support roller 24. The transfer bias applied at this time has the same polarity (−) as the polarity (−) of the toner. The electrostatic force from the intermediate transfer belt 20 to the recording paper P acts on the toner image, and the toner image on the intermediate transfer belt 20 is transferred onto the recording paper P. The secondary transfer bias at this time is determined according to the resistance detected by a resistance detection unit (not illustrated) for detecting the resistance of the secondary transfer portion, and is voltage-controlled.

The recording paper P onto which the toner image is transferred is sent to a pressure contact portion (nip portion) of a pair of fixing rollers in a fixing device 28 (an example of the fixing unit), the toner image is fixed on the recording paper P, and a fixed image is formed. The recording paper P, on which the fixing of the color image is completed, is conveyed out toward a discharge unit, and a series of color image forming operations is completed.

Examples of the recording paper P onto which the toner image is transferred include plain paper for use in electrophotographic copying machines and printers. As the recording medium, in addition to the recording paper P, an OHP sheet or the like may be used. To further improve the smoothness of the image surface after fixing, the surface of the recording paper P is also preferably smooth. For example, coated paper obtained by coating the surface of plain paper with a resin or the like, art paper for printing, and the like are preferably used.

<Process Cartridge and Toner Cartridge>

When the thermoplastic resin particle according to the exemplary embodiment is used as an electrostatic charge image developer, the process cartridge is a process cartridge which includes a developing unit for storing the electrostatic charge image developer containing the thermoplastic resin particle according to the exemplary embodiment and for developing, as a toner image, the electrostatic charge image formed on the surface of the image carrier by using the electrostatic charge image developer, and which is attached to and detached from the image forming apparatus.

The process cartridge may be configured to include a developing unit and, if necessary, at least one selected from other units such as an image carrier, a charging unit, an electrostatic charge image forming unit, and a transfer unit.

Hereinafter, an example of the process cartridge will be shown, but the process cartridge is not limited thereto. In the following description, the main parts shown in the drawings will be described, and description of the other parts will be omitted.

FIG. 2 is a schematic configuration diagram illustrating an example of the process cartridge for use in the exemplary embodiment.

A process cartridge 200 illustrated in FIG. 2 is configured as a cartridge by, for example, integrally combining and holding a photoconductor 107 (an example of the image carrier), a charging roller 108 (an example of the charging unit) provided around the photoconductor 107, a developing device 111 (an example of the developing unit), and a photoconductor cleaning device 113 (an example of the cleaning unit) by a housing 117 provided with a mounting rail 116 and an opening 118 for exposure.

In FIG. 2, 109 denotes an exposure device (an example of the electrostatic charge image forming unit), 112 denotes a transfer device (an example of the transfer unit), 115 denotes a fixing device (an example of the fixing unit), and 300 denotes recording paper (an example of the recording medium).

Next, the toner cartridge will be described.

The toner cartridge is a toner cartridge for storing the thermoplastic resin particle according to the exemplary embodiment as an electrostatic charge image developing toner and attached to and detached from the image forming apparatus. The toner cartridge includes a replenishment toner for supplying the toner to the developing unit provided in the image forming apparatus.

The image forming apparatus illustrated in FIG. 1 is an image forming apparatus having a configuration in which the toner cartridges 8Y, 8M, 8C, 8K are attached and detached. The developing devices 4Y, 4M, 4C, and 4K are connected to the toner cartridges corresponding to the respective colors by a toner supply pipe (not illustrated). When the toner stored in the toner cartridge is used up, the toner cartridge is replaced.

EXAMPLES

Hereinafter, Examples of the present invention will be described, but the present invention is not limited to the following Examples. In the following description, all "parts" and "%" are based on mass unless otherwise specified.

<Method for Producing Polyester Resin A>

Terephthalic acid: 30 parts by mole
Fumaric acid: 70 parts by mole
Bisphenol A ethylene oxide adduct: 5 parts by mole
Bisphenol A propylene oxide adduct: 95 parts by mole To a flask equipped with a stirrer, a nitrogen inlet tube, a temperature sensor, and a rectification column, the above materials are charged, the temperature is raised to 220° C. over 1 hour, and 1 part of titanium tetraethoxide is added with respect to 100 parts of the above materials. The temperature is raised to 230° C. over 30 minutes while distilling off the produced water, the dehydration condensation reaction is continued at 230° C. for 1 hour, and then the reaction product is cooled. Thus, a polyester resin A having an acid value of 12.0 mgKOH/g and a glass transition temperature of 60° C. is obtained.

<Method for Producing Polyester Resin B>

A polyester resin B is produced by the same production method as for the polyester resin A except that terephthalic acid is changed to 27 parts by mole. A polyester resin B having an acid value of 1.0 mgKOH/g and a glass transition temperature of 58° C. is obtained.

<Method for Producing Polyester Resin C>

A polyester resin C is produced by the same production method as for the polyester resin A except that terephthalic acid is changed to 37.5 parts by mole. A polyester resin C having an acid value of 50.0 mgKOH/g and a glass transition temperature of 62° C. is obtained.

<Preparation of Resin Fine Particle Dispersion Liquid (P1)>

—Melting Step—

200 parts by mass of the polyester resin A (glass transition temperature Tg: 60° C.), 0.4 part by mass of a 25 mass % sodium hydroxide aqueous solution, and 2 parts by mass of a basic fluorescent dye A (Basic Violet 11:1, manufactured by Taoka Chemical Co., Ltd.) are charged into a raw material inlet of a twin-screw extruder (trade name: TEM26SS, manufactured by Toshiba Machine Co., Ltd), and via the fourth barrel of the twin-screw extruder, 4.1 parts by mass of a 48.5 mass % aqueous solution of sodium dodecyldiphenyl ether disulfonate (ELEMINOL MON-7 manufactured by Sanyo Chemical Industries, Ltd.) is charged as a surfactant. The raw materials are melted at a barrel temperature of 90° C. and a screw speed of 400 rpm (revolutions per minute), to prepare an oily mixture.

—Emulsification Step (Inversion Emulsification Step)—

Into the twin-screw extruder, 150 parts by mass of ion-exchanged water adjusted to 90° C. (ion-exchanged water 1) is added via the fifth barrel, 150 parts by mass of ion-exchanged water adjusted to 90° C. (ion-exchanged water 2) is added via the seventh barrel, and 150 parts by mass of ion-exchanged water adjusted to 90° C. (ion-exchanged water 3) is added via the ninth barrel. The oily mixture is emulsified to obtain a resin fine particle dispersion liquid (P1). The average supply rate F of the oily mixture at this time is 12 kg/h.

The volume average particle diameter distribution of particles in the obtained resin fine particle dispersion liquid is measured by a laser diffraction type particle diameter distribution measurement device (LA-700, manufactured by Horiba Ltd.). As a result, the volume average particle diameter of the resin fine particles is 0.2 μm. The solid content is 31%.

<Preparation of Resin Fine Particle Dispersion Liquids (P2) to (P18), (P20) and (P21)>

Resin fine particle dispersion liquids (P2) to (P18), (P20) and (P21) are prepared in the same manner as the resin fine particle dispersion liquid (P1), except that the type of the polyester resin, the amount of the base, the amount of the surfactant, and the pH during the emulsification step are changed as shown in Table 1, and the following points are changed.

In (P6), a basic fluorescent dye B (Basic Red 1:1, Rhodamine 6GCP-N manufactured by Taoka Chemical Co., Ltd.) is used as the basic dye.

In (P7), a basic fluorescent dye C (Basic Violet 10, Rhodamine B manufactured by Taoka Chemical Co., Ltd.) is used as the basic dye.

In (P8), a basic fluorescent dye D (Basic Yellow 40, Coumarin 40 manufactured by Neelikon) is used as the basic dye.

In (P9), a basic fluorescent dye E (Basic Red 13, manufactured by Tokyo Chemical Industry Co., Ltd.) is used as the basic dye.

In (P10), a basic fluorescent dye F (Basic Blue 45, manufactured by Tokyo Chemical Industry Co., Ltd.) is used as the basic dye.

In (P11), a basic dye G (Basic Yellow 2, manufactured by Tokyo Chemical Industry Co., Ltd.) is used as the basic dye.

<Preparation of Resin Fine Particles (P19): Kneading Pulverization Method>

Into the raw material inlet of the twin-screw extruder (trade name: TEM26SS, manufactured by Toshiba Machine Co., Ltd), 200 parts by mass of the polyester resin A and 2 parts by mass of the basic fluorescent dye A (Basic Violet 11:1, manufactured by Taoka Chemical Co., Ltd.) are charged to obtain a kneaded product. The obtained kneaded product is crushed using a crusher (crusher AFG100, manufactured by Hosokawa Micron Corporation) to obtain resin fine particles (P19).

<Preparation of Resin Particle Dispersion Liquid (1)>

Terephthalic acid: 30 parts by mole

Fumaric acid: 70 parts by mole

Bisphenol A ethylene oxide adduct: 5 parts by mole

Bisphenol A propylene oxide adduct: 95 parts by mole

To a flask equipped with a stirrer, a nitrogen inlet tube, a temperature sensor, and a rectification column, the above materials are charged, the temperature is raised to 220° C. over 1 hour, and 1 part of titanium tetraethoxide is added with respect to 100 parts of the above materials. The temperature is raised to 230° C. over 30 minutes while distilling off the produced water, the dehydration condensation reaction is continued at 230° C. for 1 hour, and then the reaction product is cooled. Thus, a polyester resin having a weight average molecular weight of 18,000 and a glass transition temperature of 60° C. is obtained.

To a container equipped with a temperature control unit and a nitrogen replacement unit, 40 parts of ethyl acetate and 25 parts of 2-butanol are charged to prepare a mixed solvent. Then, 100 parts of the polyester resin is gradually charged and dissolved therein, and a 10 mass % aqueous ammonia solution (amount equivalent to 3 times the acid value of the resin in a molar ratio) is charged and stirred for 30 minutes. Next, the inside of the container is replaced with dry nitrogen, the temperature is maintained at 40° C., and 400 parts of ion-exchanged water is added dropwise at a rate of 2 parts/min while stirring the mixed liquid. After the completion of the dropping, the temperature is returned to room temperature (20° C. to 25° C.), and bubbling is performed with dry nitrogen for 48 hours while stirring, to obtain a resin particle dispersion liquid in which ethyl acetate and 2-butanol are reduced to 1,000 ppm or less. Ion-exchanged water is added to the resin particle dispersion liquid to adjust the solid content to 20 mass % to obtain a resin particle dispersion liquid (1).

<Preparation of Release Agent Particle Dispersion Liquid (1)>

Paraffin wax (HNP-9 manufactured by Nippon Seiro Co., Ltd.): 100 parts

Anionic surfactant (Neogen RK manufactured by DKS Co. Ltd.): 1 part

Ion-exchanged water: 350 parts

The above materials are mixed, heated to 100° C., and dispersed using a homogenizer (trade name: Ultra Turrax T50, manufactured by IKA Company), and then a dispersion treatment is performed using a Manton-Gaulin high-pressure homogenizer manufactured by Gaulin Company, to obtain a release agent particle dispersion liquid (1) (solid content 20 mass %) in which release agent particles having a volume average particle diameter of 200 nm are dispersed.

Example 1

<Preparation of Toner Particles (1)>

Resin fine particle dispersion liquid (P1): 3.7 parts

Resin particle dispersion liquid (1): 80 parts

Release agent particle dispersion liquid (1): 8.0 parts

Anionic surfactant (Neogen RK manufactured by DKS Co. Ltd., 20%): 1.1 parts

The above materials are charged into a round stainless steel flask, 0.1 N(=mol/L) nitric acid is added to adjust the pH to 3.5, and then 30 parts of a nitric acid aqueous solution having a polyaluminum chloride concentration of 10 mass % is added thereto. Next, the mixture is dispersed at a liquid temperature of 30° C. using a homogenizer (trade name: Ultra Turrax T50, manufactured by IKA Company), and then heated to 45° C. in a heating oil bath and kept for 30 minutes. Thereafter, 20 parts of the resin particle dispersion liquid (1) is added and kept for 1 hour, a 0.1 mol/L sodium hydroxide aqueous solution is added to adjust the pH to 8.5, and then the mixture is heated to 84° C. and kept for 2.5 hours. Then, the mixture is cooled to 20° C. at a rate of 20° C./min, the solid content is filtered off, thoroughly washed with ion-exchanged water, and dried to obtain toner particles (1). The volume average particle diameter of the toner particles (1) is 6 μm.

<Preparation of Carrier 1>

Ferrite particles (average particle diameter 35 μm): 100 parts

Toluene: 14 parts

Polymethylmethacrylate (MMA, weight average molecular weight 75,000): 5 parts

Carbon black: 0.2 part (VXC-72, manufactured by Cabot Corporation, volume resistivity: 100 Ωcm or less)

The above materials excluding ferrite particles are dispersed in a sand mill to prepare a dispersion liquid, and the dispersion liquid together with ferrite particles is charged into a vacuum degassing kneader and dried under reduced pressure with stirring, to obtain a carrier 1.

<Preparation of Toner>

To 100 parts by mass of the obtained toner particles (1), 1.5 parts by mass of hydrophobic silica (RY50, manufactured by NIPPON AEROSIL CO., LTD.) and 1.0 part by mass of hydrophobic titanium oxide (T805, manufactured by NIPPON AEROSIL CO., LTD.) are mixed and blended for 30 seconds at 10,000 rpm (revolutions per minute) using a sample mill. Thereafter, the mixture is sieved with a vibrating sieve having an opening of 45 μm to prepare a toner 1 (thermoplastic resin particles, electrostatic charge image developing toner). The volume average particle diameter of the obtained toner 1 is 6.0 μm.

<Preparation of Electrostatic Charge Image Developer>

With a V blender, 8 parts of the toner and 92 parts of the carrier are mixed to prepare a developer 1 (electrostatic charge image developer).

Examples 2 to 14 and Comparative Examples 1 to 7

Thermoplastic resin particles (electrostatic charge image developing toners) of Examples 2 to 14 and Comparative Examples 1 to 7 are prepared in the same method as in Example 1 except that the resin fine particle dispersion liquid (P1) is changed to the resin fine particle dispersion liquids (P2) to (P21) shown in Table 1.

The following evaluations are performed using the obtained thermoplastic resin particles (electrostatic charge image developing toners) and the electrostatic charge image developers of Examples 1 to 14 and Comparative Examples 1 to 7. The evaluation results are summarized in Table 1.

<Measurement of Concentration Difference of Basic Dye Between Surface Layer Portion Having Depth of 10 nm or Less from Surface of Resin Fine Particle and Center of Gravity Portion of Resin Fine Particle in Resin Fine Particle>

The resin fine particle is embedded in a resin and cut with a microtome to obtain a cross section.

For the cross section, scanning electron microscope-energy dispersive X-ray spectroscopy (SEM-EDX) analysis is performed to analyze, specifically map, the presence or absence of an element (for example, Zn depending on the basic dye contained) derived from a dye.

The concentration of the element derived from the dye is determined for each of the surface layer (in the cross-sectional view of the resin fine particle, less than 10 nm from the contour) and the center of gravity on the cross section of the resin fine particle. Specifically, the average concentration of the element derived from the dye is calculated in 5 nm square at 5 positions in the surface layers and in 5 nm square at the center of gravity for one particle, and this is performed for 50 particles. For each particle, the concentration ratio of the average concentration at the 5 positions in the surface layer to the concentration at the center of gravity is determined, and the average of the concentration ratios of 50 resin fine particles is calculated as the concentration ratio value of the basic dye. When determining the concentration of the element derived from the dye, the presence or absence of the element derived from the dye is binarized to make a contrast by SEM-EDX analysis.

<Average Distance $X^D$ Between Adjacent Basic Dye-Containing Domains in Cross Section of Thermoplastic Resin Particle>

A sample is prepared by embedding a thermoplastic resin particle in a resin. A section is prepared from the prepared sample using a microtome. The position of the dye is specified by observing the cross section of the obtained section. As an analytical method for specifying the position of the basic dye-containing domain, energy dispersive X-ray analysis (EDX) is used. The distance between the basic dye-containing domains is measured as a distance between the centers of gravity of respective basic dye-containing domains. The average distance $X^D$ between the domains is obtained by measuring the average distance between basic dye-containing domains in one thermoplastic resin particle, performing the above operation by observing cross sections of 50 or more thermoplastic resin particles and calculating an average value.

<Color Developing Density Evaluation 1>

The following work and image formation are performed in an environment of a temperature of 23° C. and a humidity of 50% RH. As an image forming apparatus for forming an evaluation image, ApeosPort IV C4470 manufactured by Fuji Xerox Co., Ltd. is prepared, a developer is charged into a developing device, and as a replenishment toner, the prepared thermoplastic resin particles (electrostatic charge image developing toner) are charged into a toner cartridge. Subsequently, a 5 cm×5 cm image, with an image area ratio of 100% and with an toner amount adjusted to 4.5 g/m$^2$, is formed on an OS-coated paper (basis weight 127 g/m$^2$) manufactured by Fuji Xerox Co., Ltd., and is output at a fixing temperature of 170° C. to evaluate the color developing density. The color developing density is measured using X-Rite (manufactured by X-Rite Inc.). For the evaluation, L* at this time is measured. A case where the value of L* is 65 or more is evaluated as A, a case where the value of L* is 60 or more and less than 65 is evaluated as B, and a case where the value of L* is less than 60 is evaluated as C. The above A to C are evaluated as follows.

A: no problem in practical use.

B: the color development is slightly inferior, but there is no problem in practical use.

C: may be clearly judged by visual inspection and there is a problem in practical use.

<Fluorescence Intensity Evaluation (Color Developing Density Evaluation 2)>

The following work and image formation are performed in an environment of a temperature of 23° C. and a humidity of 50% RH.

As an image forming apparatus for forming an evaluation image, ApeosPort IV C4470 manufactured by Fuji Xerox Co., Ltd. is prepared, a developer is charged into a developing device, and as a replenishment toner, the prepared thermoplastic resin particles (electrostatic charge image developing toner) are charged into a toner cartridge. Subsequently, a 5 cm×5 cm image with an image area ratio of 100% is formed on an OS-coated paper (basis weight 127 $g/m^2$) manufactured by Fuji Xerox Co., Ltd., and is output at a fixing temperature of 170° C. to evaluate the fluorescence intensity.

Regarding the fluorescence intensity, X-Rite (manufactured by X-Rite Inc.) is used to measure the spectral reflectance in the visible light region, and the fluorescence peak intensity in the spectral reflectance is taken as the fluorescence intensity.

A: 108% or more

B: 104% or more and less than 108%

C: 100% or more and less than 104%

D: less than 100%

TABLE 1

| | Thermoplastic resin particles No. | Resin fine particles: Type | Resin fine particles: Volume average particle diameter (μm) | Resin fine particles: Type of polyester resin | Resin fine particles: Acid value (mgKOH/g) of polyester resin | Resin fine particles: Type of basic dye | Resin fine particles: Content (part by mass) of basic dye | Concentration ratio of basic dye | $D_{50v}$ (μm) of thermoplastic resin particles | Average distance $X^D$ (μm) between basic dye-containing domains | $X^D/D_{50v}$ |
|---|---|---|---|---|---|---|---|---|---|---|---|
| Example 1 | (1) | P1 | 0.2 | Polyester resin A | 12 | Basic fluorescent dye A | 1.0 | 0.95 | 6.0 | 0.6 | 0.10 |
| Example 2 | (2) | P2 | 0.05 | Polyester resin A | 12 | Basic fluorescent dye A | 1.0 | 0.95 | 6.1 | 0.09 | 0.02 |
| Example 3 | (3) | P3 | 1.0 | Polyester resin A | 12 | Basic fluorescent dye A | 1.0 | 0.95 | 5.9 | 2.3 | 0.39 |
| Example 4 | (4) | P4 | 0.2 | Polyester resin A | 12 | Basic fluorescent dye A | 1.0 | 0.80 | 6.0 | 0.6 | 0.10 |
| Example 5 | (5) | P5 | 0.2 | Polyester resin A | 12 | Basic fluorescent dye A | 1.0 | 1.00 | 6.0 | 0.6 | 0.10 |
| Example 6 | (6) | P6 | 0.2 | Polyester resin A | 12 | Basic fluorescent dye B | 1.0 | 0.95 | 6.0 | 0.6 | 0.10 |
| Example 7 | (7) | P7 | 0.2 | Polyester resin A | 12 | Basic fluorescent dye C | 1.0 | 0.95 | 6.0 | 0.6 | 0.10 |
| Example 8 | (8) | P8 | 0.2 | Polyester resin A | 12 | Basic fluorescent dye D | 1.0 | 0.95 | 6.0 | 0.6 | 0.10 |
| Example 9 | (9) | P9 | 0.2 | Polyester resin A | 12 | Basic fluorescent dye E | 1.0 | 0.95 | 6.0 | 0.6 | 0.10 |
| Example 10 | (10) | P10 | 0.2 | Polyester resin A | 12 | Basic fluorescent dye F | 1.0 | 0.95 | 6.0 | 0.6 | 0.10 |
| Example 11 | (11) | P11 | 0.2 | Polyester resin A | 12 | Basic dye G | 1.0 | 0.95 | 6.0 | 0.6 | 0.10 |
| Example 12 | (12) | P12 | 0.2 | Polyester resin B | 1 | Basic fluorescent dye A | 1.0 | 0.85 | 6.0 | 0.6 | 0.10 |
| Example 13 | (13) | P13 | 0.2 | Polyester resin C | 50 | Basic fluorescent dye A | 1.0 | 0.97 | 6.0 | 0.6 | 0.10 |
| Example 14 | (14) | P14 | 0.2 | Polyester resin A | 12 | Basic fluorescent dye A | 1.0 | 0.95 | 6.0 | 0.6 | 0.10 |
| Comparative Example 1 | (15) | P15 | 0.04 | Polyester resin A | 12 | Basic fluorescent dye A | 1.0 | 0.95 | Cannot be prepared | — | — |
| Comparative Example 2 | (16) | P16 | 1.1 | Polyester resin A | 12 | Basic fluorescent dye A | 1.0 | 0.95 | 5.9 | 2.4 | 0.41 |
| Comparative Example 3 | (17) | P17 | 0.2 | Polyester resin A | 12 | Basic fluorescent dye A | 1.0 | 0.78 | 6.0 | 0.6 | 0.10 |
| Comparative Example 4 | (18) | P18 | 1.2 | Polyester resin A | 12 | Basic fluorescent dye A | 1.0 | 1.00 | 6.0 | 0.6 | 0.10 |

TABLE 1-continued

| | | | | | | | | | | | |
|---|---|---|---|---|---|---|---|---|---|---|---|
| Comparative Example 5 | (19) | P19 | 3.0 | Polyester resin A | 12 | Basic fluorescent dye A | 1.0 | 0.78 | 6.0 | 3.0 | 0.50 |
| Comparative Example 6 | (20) | P20 | 2.5 | Polyester resin A | 12 | Basic fluorescent dye A | 21.0 | 0.95 | 6.0 | 2.8 | 0.47 |
| Comparative Example 7 | (21) | P21 | 0.2 | Polyester resin A | 12 | Basic fluorescent dye A | 0.01 | 0.6 | 6.0 | 0.6 | 0.10 |

| | Method for producing resin fine particles | | | | Color | |
|---|---|---|---|---|---|---|
| | Type | Base amount (part by mass) | Surfactant amount (part by mass) | pH of dispersion liquid in emulsification step | developing density evaluation | Fluorescence intensity evaluation |
| Example 1 | Melting | 0.4 | 4.1 | 8.0 | — | A |
| Example 2 | Melting | 0.4 | 6.0 | 8.0 | — | A |
| Example 3 | Melting | 0.4 | 3.0 | 8.0 | — | B |
| Example 4 | Melting | 0.3 | 4.1 | 7.0 | — | C |
| Example 5 | Melting | 0.5 | 4.1 | 11.0 | — | B |
| Example 6 | Melting | 0.4 | 4.1 | 8.0 | — | A |
| Example 7 | Melting | 0.4 | 4.1 | 8.0 | — | A |
| Example 8 | Melting | 0.4 | 4.1 | 8.0 | — | A |
| Example 9 | Melting | 0.4 | 4.1 | 8.0 | — | A |
| Example 10 | Melting | 0.4 | 4.1 | 8.0 | — | A |
| Example 11 | Melting | 0.4 | 4.1 | 8.0 | A | — |
| Example 12 | Melting and emulsification | 0.4 | 4.1 | 8.0 | — | C |
| Example 13 | Melting and emulsification | 0.4 | 4.1 | 8.0 | — | B |
| Example 14 | Solvent | 0.4 | 4.1 | 8.0 | — | B |
| Comparative Example 1 | Melting | 0.4 | 6.5 | 8.0 | — | — |
| Comparative Example 2 | Melting | 0.4 | 2.7 | 8.0 | — | D |
| Comparative Example 3 | Melting | 0.25 | 4.1 | 6.8 | — | D |
| Comparative Example 4 | Melting | 0.25 | 4.1 | 11.2 | — | D |
| Comparative Example 5 | Crushing | — | — | — | — | D |
| Comparative Example 6 | Melting | 0.4 | 4.1 | 8.0 | — | D |
| Comparative Example 7 | Melting | 0.4 | 4.1 | 8.0 | — | D |

The "concentration ratio of basic dye" in Table 1 refers to the ratio of the concentration of the basic dye in the center of gravity portion of the resin fine particle to the concentration of the basic dye in the surface layer portion having a depth of 10 nm or less from the surface of the resin fine particle.

Further, in Comparative Example 1, the thermoplastic resin particles could not be produced and could not be evaluated.

From the results shown in Table 1, it is seen that the thermoplastic resin particle (an electrostatic charge image developing toner) of Examples have a color developing density of the obtained image higher than that of the thermoplastic resin particle (an electrostatic charge image developing toner) of Comparative Examples.

From the results shown in Table 1, it is also seen that the thermoplastic resin particle (an electrostatic charge image developing toner) of Examples have a high fluorescence intensity of the obtained image.

Example 15

—Preparation of Coated Product—

A 10 cm×10 cm square test panel of a zinc phosphate-treated steel plate are coated with the thermoplastic resin particles of Example 1 by a corona gun manufactured by Asahi Sunac Corporation, at a distance of 30 cm from the front surface by sliding the corona gun vertically and horizontally so as to form a coating film having a thickness of 30 μm or more and 50 μm or less, and then the coating film is baked under baking conditions of 150° C. for 5 minutes, so as to prepare a coated product.

It is confirmed that the prepared coated product is coated with the powder adhered to the product to be coated (zinc phosphate-treated steel plate).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for producing a resin fine particle comprising a polyester resin and a basic fluorescent dye, wherein a volume average particle diameter of the resin fine particle is 0.05 μm or more and 1 μm or less, and a ratio of a concentration of the basic fluorescent dye in a center of gravity portion of the resin fine particle to a concentration of the basic fluorescent dye in a surface layer portion having a depth of 10 nm or less from a surface of the resin fine particle is 0.8 or more and 1.0 or less, the method comprising:

melting an oily mixture containing at least the polyester resin, a base, and the basic fluorescent dye while applying a shearing force to the oily mixture; and emulsifying the molten oily mixture by adding a surfactant and an aqueous medium while applying a shearing force to the molten oily mixture to prepare a dispersion liquid of the resin fine particle.

2. The method for producing the resin fine particle according to claim 1, wherein a pH of the dispersion liquid is 7 or more and 11 or less.

3. The method for producing the resin fine particle according to claim 1, wherein the basic fluorescent dye is a basic fluorescent dye having at least one cationic group.

4. The method for producing the resin fine particle according to claim 2, wherein the basic fluorescent dye is a basic fluorescent dye having at least one cationic group.

5. The method for producing the resin fine particle according to claim 3, wherein the cationic group is an onium group.

6. The method for producing the resin fine particle according to claim 4, wherein the cationic group is an onium group.

7. The method for producing the resin fine particle according to claim 1, wherein the base is a hydroxide of an alkali metal.

8. The method for producing the resin fine particle according to claim 1, wherein the melting is carried out without using an organic solvent.

9. The method for producing the resin fine particle according to claim 1, wherein the polyester resin comprises an amorphous polyester resin, and wherein a melting temperature in the melting is a temperature higher than or equal to a glass transition temperature of the amorphous polyester resin.

* * * * *